US010375641B2

(12) United States Patent
Fraley

(10) Patent No.: US 10,375,641 B2
(45) Date of Patent: Aug. 6, 2019

(54) MOBILE DEVICE MANAGEMENT SYSTEM USING NETWORK PARAMETER RESOURCES

(71) Applicant: PLUTO TECHNOLOGIES, INC., Encinitas, CA (US)

(72) Inventor: James J. Fraley, Encinitas, CA (US)

(*) Notice: Subject to any disclaimer, the term of this patent is extended or adjusted under 35 U.S.C. 154(b) by 7 days.

(21) Appl. No.: 14/056,787

(22) Filed: Oct. 17, 2013

(65) Prior Publication Data

US 2014/0045481 A1    Feb. 13, 2014

Related U.S. Application Data

(63) Continuation-in-part of application No. 12/772,827, filed on May 3, 2010, now Pat. No. 8,897,375, which
(Continued)

(51) Int. Cl.
*H04N 7/12* (2006.01)
*H04W 52/02* (2009.01)
(Continued)

(52) U.S. Cl.
CPC .... *H04W 52/0258* (2013.01); *H04N 5/23203* (2013.01); *H04N 7/185* (2013.01);
(Continued)

(58) Field of Classification Search
CPC ............ H04W 52/0258; H04W 8/245; H04N 5/23203; H04N 7/185; H04N 21/4143; H04N 21/42202; H04N 21/4223; H04N 21/4227; H04N 21/4586; H04N 21/4788; H04N 21/632; Y02D 70/122;
(Continued)

(56) References Cited

U.S. PATENT DOCUMENTS 7,200,390 B1    4/2007   Henager et al.
7,284,033 B2   10/2007   Jhanji
(Continued)

OTHER PUBLICATIONS

International Search Report and Written Opinion dated Feb. 11, 2015 issued in corresponding PCT application PCT/US14/59546.
(Continued)

*Primary Examiner* — Richard T Torrente
(74) *Attorney, Agent, or Firm* — Merle W. Richman, III

(57) ABSTRACT

A mobile device management system stores network parameters so that certain functionality can be disabled or placed in sleep mode to optimize and lengthen battery life. The mobile device analyzes its user calendar schedule to download navigation data and network parameters so that tasks such as downloading information and updates are performed during times that the mobile device is connected to lower cost network access such as WiFi networks. By performing tasks such as the downloading of information based on availability of low cost network resources, the battery life of the mobile device may be lengthened. By storing network parameters such as the location of dead zones and roaming zones, the constant pinging of the RF baseband chip can be disabled and only enabled when the mobile device knows it is close to an areas where the mobile device must switch networks, further reducing power consumption.

21 Claims, 20 Drawing Sheets

Related U.S. Application Data is a continuation of application No. 10/430,197, filed on May 5, 2003, now abandoned.

(51) Int. Cl.

| | | |
|---|---|---|
| *H04W 8/24* | (2009.01) | |
| *H04N 5/232* | (2006.01) | |
| *H04N 7/18* | (2006.01) | |
| *H04N 21/4143* | (2011.01) | |
| *H04N 21/422* | (2011.01) | |
| *H04N 21/4223* | (2011.01) | |
| *H04N 21/4227* | (2011.01) | |
| *H04N 21/458* | (2011.01) | |
| *H04N 21/4788* | (2011.01) | |
| *H04N 21/63* | (2011.01) | |

(52) U.S. Cl.
CPC ..... *H04N 21/4143* (2013.01); *H04N 21/4223* (2013.01); *H04N 21/4227* (2013.01); *H04N 21/42202* (2013.01); *H04N 21/4586* (2013.01); *H04N 21/4788* (2013.01); *H04N 21/632* (2013.01); *H04W 8/245* (2013.01); *Y02D 70/00* (2018.01); *Y02D 70/122* (2018.01); *Y02D 70/1262* (2018.01); *Y02D 70/142* (2018.01); *Y02D 70/144* (2018.01); *Y02D 70/164* (2018.01); *Y02D 70/23* (2018.01); *Y02D 70/26* (2018.01)

(58) Field of Classification Search
CPC ............. Y02D 70/1262; Y02D 70/164; Y02D 70/142; Y02D 70/144; Y02D 70/23; Y02D 70/26; Y02D 70/00
See application file for complete search history.

(56) References Cited

U.S. PATENT DOCUMENTS

| | | | |
|---|---|---|---|
| 7,571,254 | B1 | 8/2009 | Canova, Jr. et al. |
| 8,259,652 | B2* | 9/2012 | Huang ............... H04W 48/18 370/328 |
| 2003/0054810 | A1 | 3/2003 | Chen et al. |
| 2004/0008780 | A1 | 1/2004 | Lai et al. |
| 2004/0013192 | A1 | 1/2004 | Kennedy |
| 2004/0209600 | A1 | 10/2004 | Werner et al. |
| 2007/0275700 | A1* | 11/2007 | Agrawal ............ G06Q 10/109 455/414.1 |
| 2009/0149176 | A1 | 6/2009 | Vuong et al. |
| 2011/0035420 | A1 | 2/2011 | Alizadeh-Shabdiz et al. |
| 2011/0176482 | A1 | 7/2011 | Vizor et al. |
| 2012/0083285 | A1 | 4/2012 | Shatsky et al. |
| 2012/0092991 | A1 | 4/2012 | Jeong et al. |
| 2013/0018574 | A1 | 1/2013 | Adler |
| 2013/0078994 | A1* | 3/2013 | Jouin ................. G06F 3/1438 455/426.1 |
| 2014/0242961 | A1* | 8/2014 | Bruins ............... H04W 4/001 455/418 |

OTHER PUBLICATIONS

International Preliminary Report on Patentability dated Oct. 6, 2015 issued in corresponding PCT application PCT/2014/059546.

\* cited by examiner

MOBILE DEVICE MANAGEMENT SYSTEM USING NETWORK PARAMETER RESOURCES

CROSS-REFERENCE TO RELATED APPLICATIONS

This application is a continuation-in-part of U.S. Ser. No. 12/772,827, filed on May 3, 2010, which is a continuation of U.S. Ser. No. 10/430,197, filed on May 5, 2003, the entire contents of which are incorporated herein by reference.

BACKGROUND OF THE INVENTION

1. Field of the Invention

This invention relates to mobile communication systems. Specifically, this invention relates to a mobile device management system that optimizes the use of battery power so that battery life is preserved.

2. Related Art

The industrialized world is becoming increasingly reliant on mobile technologies, such as wireless voice and data transmission. In addition to voice and data transmission, users now demand useful and innovative video and multimedia applications that are supported by their cell phones and personal digital assistants (PDAs). One video application that would be of particular utility to a mobile device user is the ability to view and monitor feed from a remote video camera on their mobile device. The delivery of live video feed generally requires broadband transmission media capable of supporting a very high data rate signal. Wireless systems, however, are typically characterized by lower device processing power and channels having reduced bandwidth and lower reliability. Hence, the receipt and display of video feed from a remote camera on a mobile device is difficult to achieve over a wireless link.

Mobile device users also demand reliable and innovative mechanisms for updating personal data, such as calendar and scheduling information, that is stored on their mobile devices. The ability to update calendar and schedule information with real time location information about other mobile device users with whom the user is scheduled to or desires to interact would be particularly invaluable. Typically, however, personal data stored on a mobile device is updated via synchronization with a larger system such as a server or personal computer. The mobile device usually must be cabled to the system for update of personal data and calendar information, and the updates are often user-initiated rather than system-driven or automatic. Real time, automatic updating of calendar information incorporating location information about other mobile devices is not provided by current systems.

SUMMARY OF THE INVENTION

A mobile device management system that stores network parameters so that certain functionality operating in the mobile device can be disabled or placed in sleep mode so that battery life is optimized. The mobile device analyzes the mobile device user's calendar schedule to download navigation data and network parameters so that the mobile device performs certain tasks such as downloading information and updates during times that the mobile device is connected to lower cost network access such as WiFi connections. By optimizing tasks such as the downloading of information based on using low cost network resources, the battery life of the mobile device may be increased.

Also, by knowing and storing into memory network parameters such as the location of dead zones and where the mobile device must roam, the constant pinging of the RF baseband chip can be disabled and only enabled when the mobile device knows it is close to an area where the mobile device must switch networks, thereby lowering the power consumption of the mobile device.

This invention also provides a system for mobile device event management, using location and calendar information. Calendar and location information is shared among multiple devices and used to schedule, re-schedule and manage events. The relative proximity of the mobile devices may be displayed.

This invention also provides for the uploading and downloading and storing of network parameters such as dead zones and the availability of network resources such as (1) least cost routing; (2) latency issues; (3) available bandwidth; (4) types of bandwidth e.g. CDMA, GSM, LTE, etc.; (5) total throughput; and (6) data throttling such as when used in situations of voice over IP ("VoIP") or voice over LTE ("VoLTE"). Once the mobile device acquires the network parameters for a given location, this information can be stored in memory on the mobile device and later uploaded to the network carrier so other network carrier users can download the network parameters and optimize their mobile device's functionality and battery life.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION OF THE INVENTION

The invention provides a comprehensive system for mobile device management. It includes a system for monitoring, receiving and displaying video feed from a remote camera on a mobile device, and a system for real time mobile device event management using calendar and location information. Drawbacks associated with existing event scheduling methodologies are overcome by incorporating real time location information and video feed into a robust system of mobility management that has application in several practical areas, including surveillance, safety, security and knowledge based self-learning.

Figure 1:
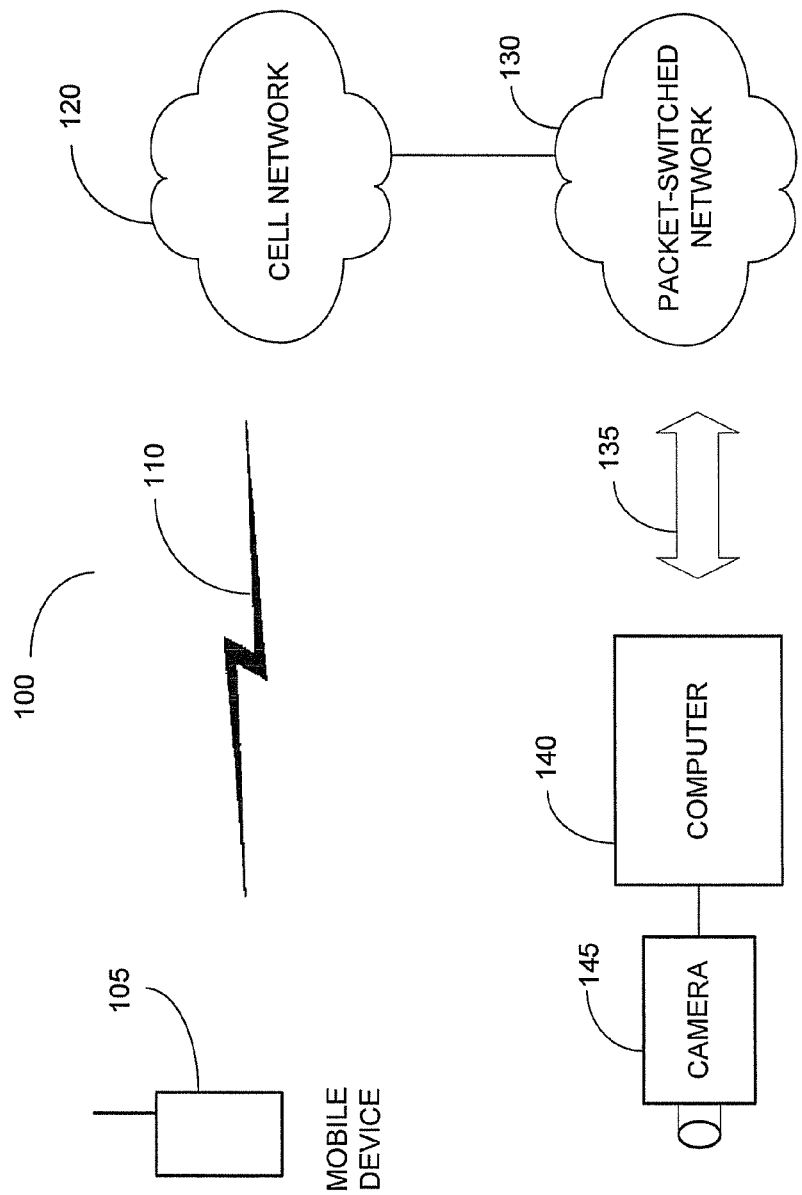
FIG. 1 is a diagram of an inventive mobile device video monitoring system.

FIG. 1 illustrates a wireless video monitoring system 100. Video monitoring system 100 has broad application and may be implemented wherever it is advantageous to use a mobile or wireless device (such as a cellular telephone) to monitor images captured by a remote camera. With monitoring system 100, for example, a mobile device can be employed to monitor one's home while on vacation, or to monitor the babysitter or the pets. As will be described below, this invention even allows the mobile device user to issue control signals to the camera to change the video feed that is received by the mobile device.

Referring to FIG. 1, mobile device 105 is coupled to cell network 120 over air interface 110. Computer 140 delivers a live video image from camera 145 to mobile device 105 via network connection 135, packet-switched network 130 and cell network 120. Cell network 120 can be a public or private cellular network providing the necessary architecture for mobile call maintenance, including base station subsystem(s), mobile switching center(s), location registries and other infrastructure components including IP based. In one embodiment, cell network 120 is a public, wireless wide area network ("W-WAN") supporting one or more multiple access schemes (i.e., TDMA, CDMA, etc.) and coupled to the Internet.

Packet-switched network 130 is a public or private wide area network ("WAN") or local area network ("LAN") supporting transport services for delivering video packets between camera 145 and mobile device 105. In one embodiment, network 130 is a private intranet supporting a proprietary packet transport mechanism. In another embodiment, network 130 is the Internet and supports the transmission control protocol ("TCP") and Internet protocol ("IP"). In this embodiment, computer 140 is configured with either a static or dynamic IP address. Mobile device 105 can be manually configured with the IP address of computer 140, or configured to receive the IP address of computer 140 dynamically, using for example, the short message service ("SMS") protocol to communicate the IP addressing information.

Network connection 135 can use a variety of data communication technologies to connect computer 140 to packet-switched network 130. If network 130 is the Internet, computer 140 can connect to Internet 130 using an Internet service provider ("ISP") under a variety of connectivity options, including cable, digital subscriber line ("DSL"), or asynchronous dial-up access over the public switched telephone network ("PSTN") using a conventional modem. Network connection 135 can also be a high-speed dedicated circuit running between an ISP and computer 140. Network connection 135 can itself incorporate a wireless data communication link. The test results described were achieved using a cable modem to connect between computer 140 and packet-switched network ("Internet") 130.

Mobile device 105 may be one of many widely available wireless communication devices, such as a smart mobile device, smart phone/cellular telephone, a personal digital assistant ("PDA"), a laptop personal computer equipped with a wireless modem or even a smart mobile television. Exemplary implementations of mobile device 105 include a code division multiple access ("CDMA") mobile device and a handheld mobile device with wireless capability. System 100 supports true device independence and is uniquely tailored to operate on third generation and later generations CDMA mobile devices on the market.

Figure 2:
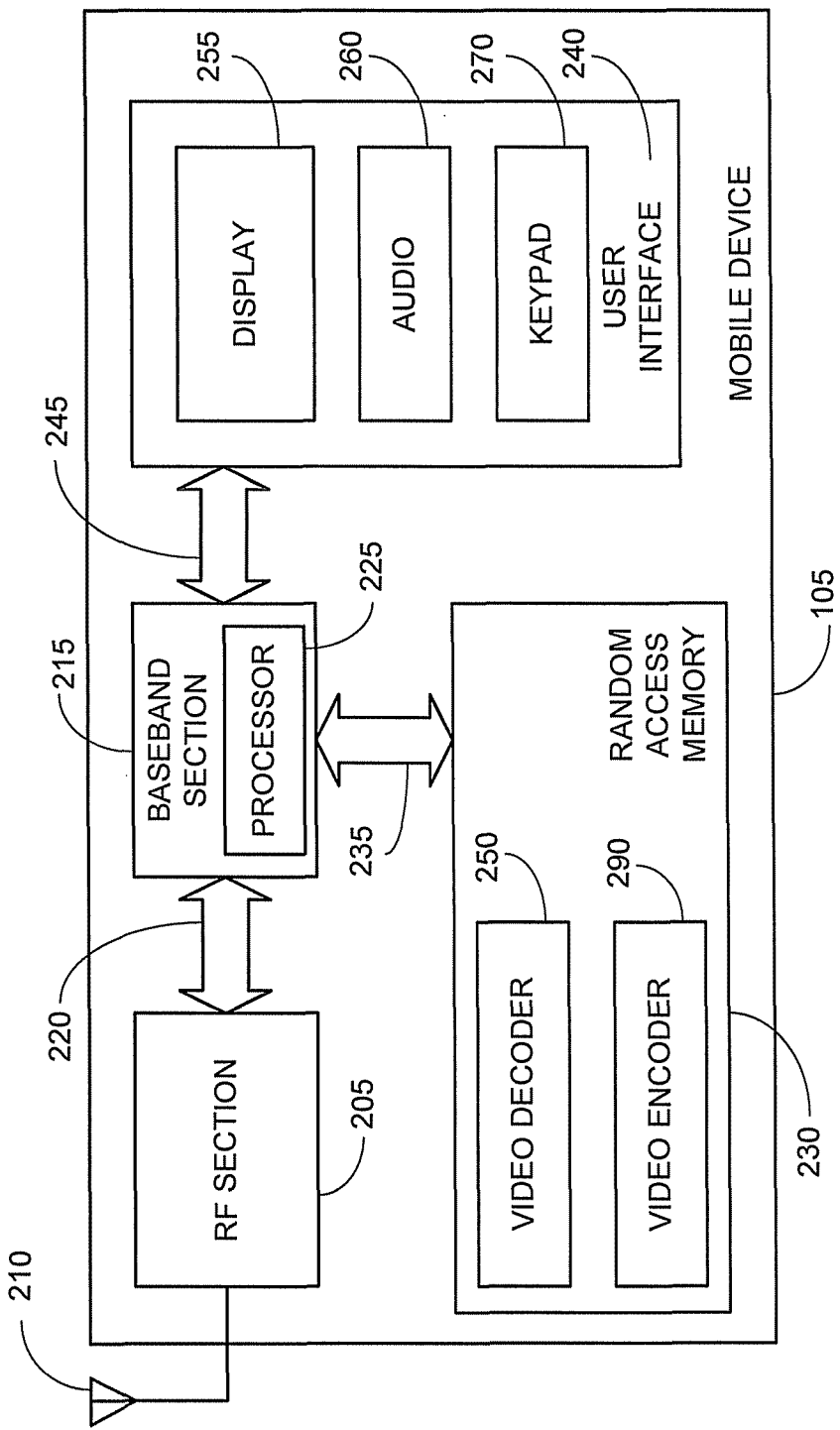
FIG. 2 is a block diagram illustrating the components of the mobile device of FIG. 1 in more detail.

FIG. 2 illustrates mobile device 105 in more detail. Radio frequency ("RF") section 205 is coupled to antenna 210 for receiving and transmitting RF signals. RF section 205 communicates with baseband section 215 over bus 220. Baseband section 215 comprises a processor 225 for voice and data signal processing. Baseband section 215 stores and retrieves data from random access memory ("RAM") 230 over memory bus 235. Baseband section 215 also communicates with user interface 240 over interface bus 245. User interface 240 typically comprises a display 255 for displaying text, graphics or video, a keypad 270 for entering data and dialing, and an audio system 260, such as a speaker.

Mobile device 105 is preferably configured with software video decoder 250 for decoding video signals. Mobile device 105 may also be configured with software video encoder 290 for encoding and transmitting video control information. By implementing the encoding and decoding processes in software, system 100 is device and processor independent. In other words, viewing a video bit stream is possible on any mobile device because the video decoder and encoder are implemented in software rather than embedded or hard-coded for operation on a particular wireless device chipset.

Use of an application programming interface (API) provides the abstraction layer needed to support device and processor independence. Function calls from decoder 250 can be written to conform to a particular API, such as Google Android and open source operating systems or Qualcomm Inc.'s binary runtime environment for wireless (BREW), instead of to a particular chip (i.e., processor). If the encoding and decoding software is written in BREW, for example, the video decoder and encoder can be loaded and run on any mobile device that supports BREW. An API such as BREW is also useful for providing the necessary IP connectivity. Video decoder 250 can be written to pass IP related function calls to the BREW API, which will then handle the details of establishing a link between mobile device 105 and computer 140.

The achievable frame rate, video rendering quality and performance are functions of the processing power and memory at the disposal of mobile device 105. For delay sensitive live video feed, for example, a relatively fast processor is needed to eliminate frame latency, e.g. using an advanced RISC machine such as an ARM microprocessor with sufficient RAM.

Video encoder 290 may send control data over cell network 120 and packet switched network 130 to computer 140 to control camera 145. Hence, a mobile user can remotely control basic camera functions, such as pan, zoom, and tilt, from device 105. Video encoder 290 is preferably a software-based video encoder loaded into RAM 230. A mobile device 105 including both decoder 250 and encoder 290 supports full duplex operation—with live video feed in one direction (from camera 145 to mobile device 105) and control information in the other direction (from mobile device 105 to camera 145).

The protocol used to stream video can be a standard packet-based video compression protocol such as the MPEG4 video compression standard, modified to control special features and limitations of this invention. The video frame flow control mechanism is modified to accommodate the relatively limited amount of mobile device frame buffer space that is available. Device 105 waits until assembly of a complete multi-packet video frame is complete before signaling computer 140 (typically with a one byte header) to send another frame. Computer 140 waits for receipt of this header before sending another video frame to the mobile device. This differs from conventional TCP protocol and is advantageous because MPEG4 video decoding is resource and bandwidth intensive while device 105 is typically bandwidth limited. The prototype CDMA phone used in the inventors' tests, for example, had a useable 14 kilobits per second of bandwidth.

Since a typical mobile device will lack the storage capacity to permanently store an incoming video image or stream, another important feature of system 100 is configuring the size and resolution of mobile device display 255 to best take advantage of the available storage capacity. Display 255 may be an LCD panel having a resolution large enough to accurately distinguish and render a video image. In one embodiment, display 255 is a color display capable of supporting an MPEG4 compressed video bit stream. Other display technologies and display enhancements commonly found on wireless devices, such as windowing and backlighting, are supported by system 100. The video display features of the API that is used, such as BREW, can be employed to effect display of the video image. Satisfactory results were achieved in a laboratory prototype developed by the inventors that included a cell phone having a 256 color, (8-bit) 128×144 pixel display supporting a video image having a frame size of 128 pixels tall by 96 pixels wide.

Figure 3:
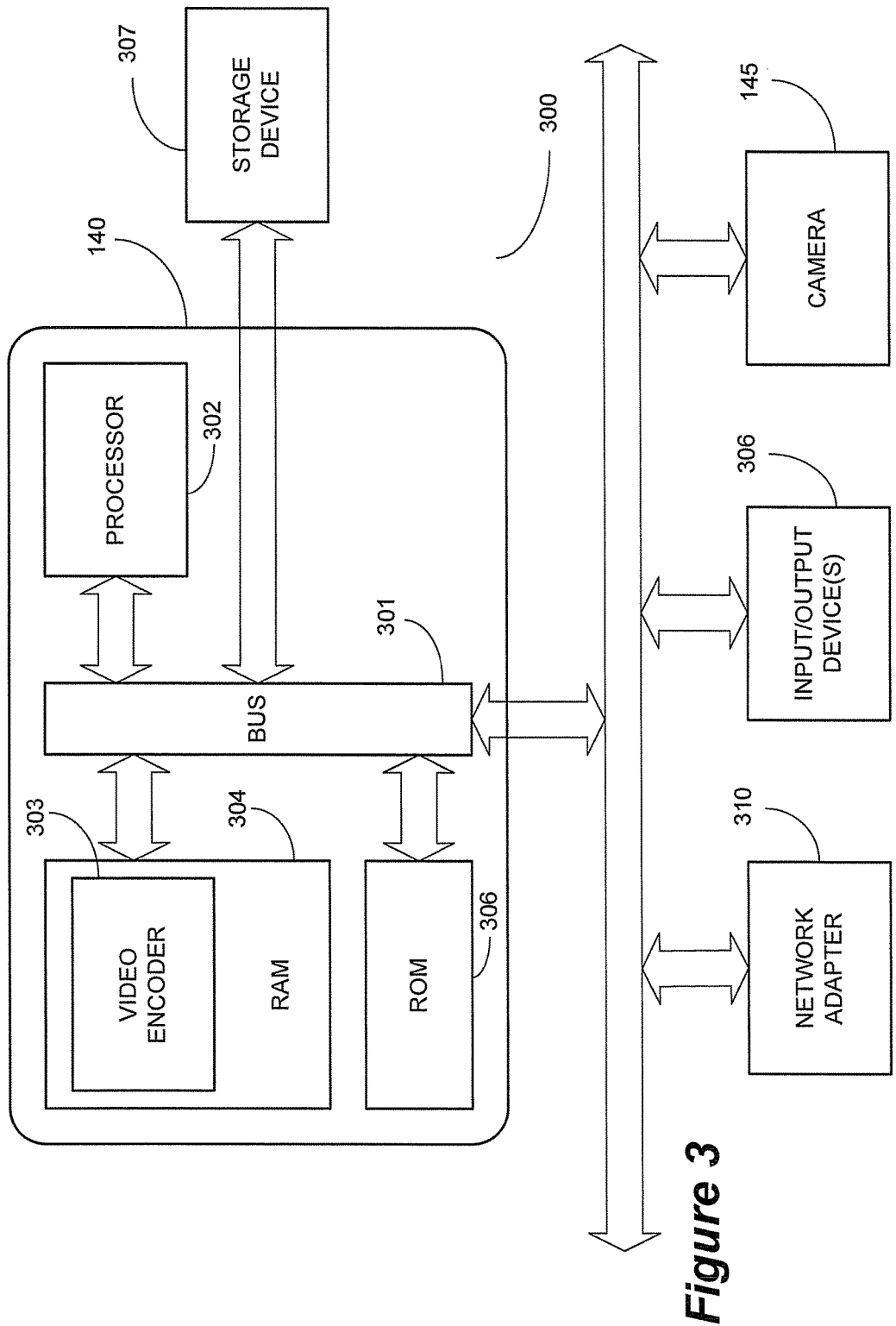
FIG. 3 is a block diagram illustrating the components of the computer system of FIG. 1 in more detail.

A computer system 300 including computer 140 and camera 145 is illustrated in more detail in FIG. 3. Computer 140 preferably has a software-based video encoder 303 and may be configured to operate as a video server. This is a significant departure from streaming video systems which employ hardware-based video encoders. A software video encoder provides many advantages, including efficient resource utilization and no special hardware requirements. So long as it has the minimum components needed to load and run a software video encoder, computer 140 may be a conventional desktop computer including components such as processor 302, dynamic memory ("RAM") 304 and static memory ("ROM") 306 coupled via a bus 301 or other communication mechanism. An external storage device 307, such as a magnetic or optical disk, input/output devices 309, such as a keyboard and a monitor, and a network adapter 310, such as a network interface card ("NIC"), may also be coupled to computer 140.

Video camera 145 may be any camera capable of capturing and streaming a video image to computer 140 for transmission to mobile device 105. Connectivity between computer 140 and camera 145 can be a simple universal serial bus ("USB") or other serial cable connector. The video generated by camera 145 may be a still image, such as an image presentable in JPEG format, or a component of a live streaming video feed, such as a feed presentable in MPEG4 format.

As mentioned, computer 140 is preferably configured with a software video encoder 303 stored in the dynamic memory or RAM 304. As described with respect to mobile device 105, hardware independence is achieved by the use of a software-based decoder. The video decoding software is written to a particular operating system API, such as Microsoft Windows® or Linux®, rather than embedded or hard-coded for operation on a particular processor. The prototype computer used by the inventors included an Intel Pentium® III processor running Microsoft Windows®.

Computer 140 may be deployed in a client/server environment having multiple mobile devices, video cameras and servers. Mobile device 105 typically acts as a client (video decoder 250) and computer 140 acts as a server (video encoder 303). Additionally, as described, mobile device 105 may include software-based video encoder 290 for transmitting camera control signals to computer 140.

Figure 4:
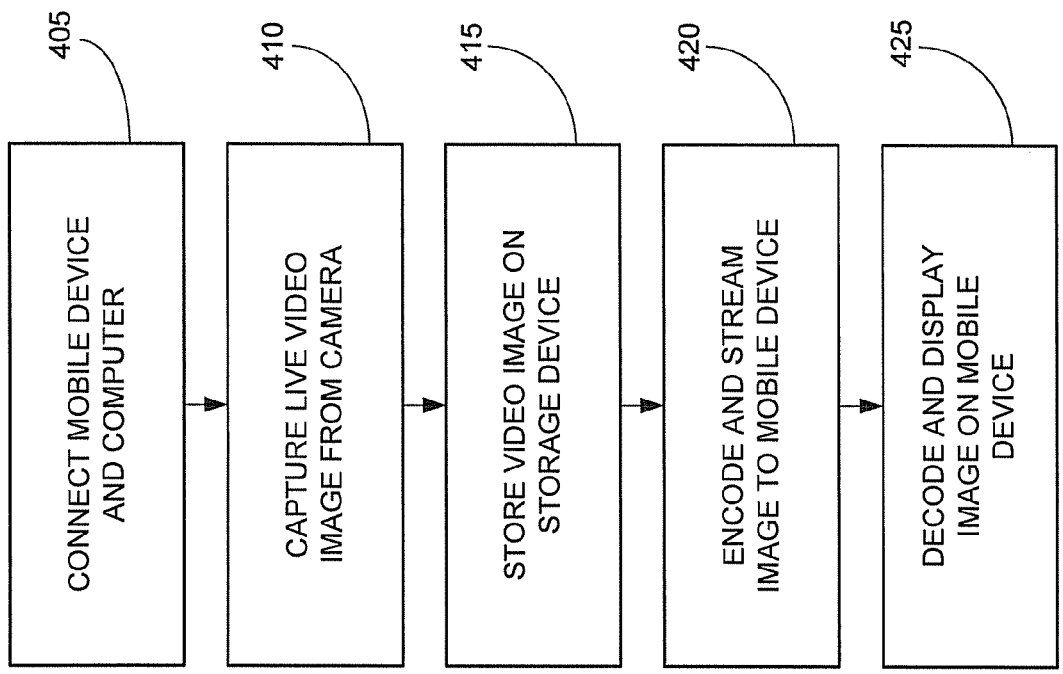
FIG. 4 is a flow diagram of an inventive method for delivering and displaying video on a mobile device.

FIG. 4 depicts a method 400 for delivering video from camera 145 to mobile device 105 for display. In step 405, connectivity is established between mobile device 105 and computer 140. In step 410, computer 140 captures a live video image from camera 145. In step 415, computer 140 stores the captured image on a storage device, such as storage device 107. Alternatively, the video can be stored on a storage device located within or associated with network 130. In step 420, computer 140 encodes and streams the video image to mobile device 105 over packet-switched network 130 and cell network 120. In step 425, mobile device 105, receives, decodes and displays the video image on display 255. Device 105 waits for receipt of a complete multi-packet video frame before signaling computer 140 to send another frame to device 105.

Several modes of operation are envisioned. In a "live" mode, the mobile user may simply view live video feed in real time. In a "history" mode, computer 140 may assemble and deliver to mobile device 105 a summary file containing images of significant activity only. Timestamps may accompany the images logged in the summary file. A motion detector, for example, may be coupled to or proximate camera 145, and only those portions of video feed in which motion occurs would be deemed "significant" by computer 140 and added to the summary file. In an "alert" mode, a real time alert along with video feed may be provided to the mobile device user upon motion detection. The history and alert modes are very useful for security and surveillance applications.

Another aspect of this invention is a system and method for real time mobile device event scheduling, synchronization and modification, using location information. Intelligent event calendar and schedule information is incorporated and shared among multiple mobile devices. A first mobile device updates its calendar/event schedule by obtaining location and calendar information from a second mobile device. The location information may be obtained with the assistance of a global positioning system ("GPS") and used to graphically represent the location of the second mobile device on the display of the first mobile device. Audible or visible indicia of the proximity of the second device can also be provided, such as by a beeping sound or an LED.

Figure 5:
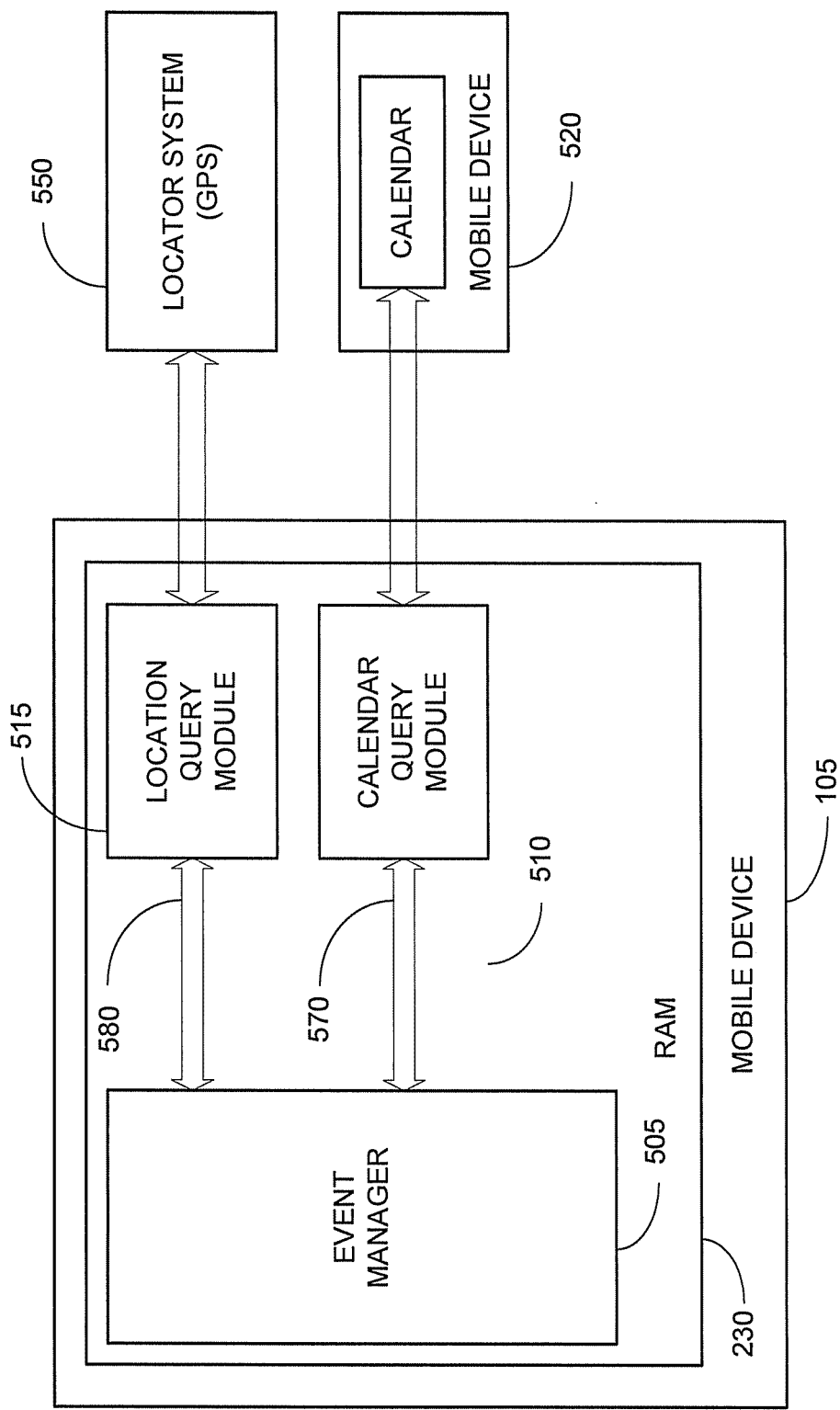
FIG. 5 is a block diagram of an inventive peer-to-peer mobile device event scheduling system.

FIG. 5 depicts mobile device event management system 500 for managing events between mobile device 105 and second mobile device 520. Mobile device 105 comprises, in addition to the components discussed with respect to FIG. 2, event manager 505, calendar query module 510, and location query module 515, which are preferably implemented in software (i.e., executable in RAM 230) using a suitable API, such as BREW or Java. Calendar query module 510 queries second mobile device 520 over wireless channel 525 to obtain information stored in its calendar 530. Location query module 515 queries a locator system 550, such as a satellite-based GPS, over wireless channel 560 to obtain the location of second mobile device 520. Other location query methodologies are known to one skilled in the art and may be employed with the calendar query module 510. Modules 510 and 515 communicate with manager 505 via busses 570 and 580.

The peer-to-peer implementation of system 500 depicted in FIG. 5 is effective for managing events, such as schedule creation and synchronization, between two mobile devices 105 and 520. A server could also be added to system 500 to permit shared calendar and event synchronization, update and modification among many users.

Mobile device 520, like mobile device 105, may be any of a wide array of mobile communication products, including cellular telephones, personal digital assistants, portable personal computers with wireless capability, and the like. Likewise, channel 525 may be any of a large number of wireless air interfaces available for establishing a wireless link. For example, channel 525 can be a public or private W-WAN or W-LAN, such as a personal communication service ("PCS") network using CDMA, a global system for mobile communication ("GSM") network using time division multiple access ("TDMA"), and/or even a local wireless personal area network ("PAN") incorporating Bluetooth™ technology.

Figure 6:
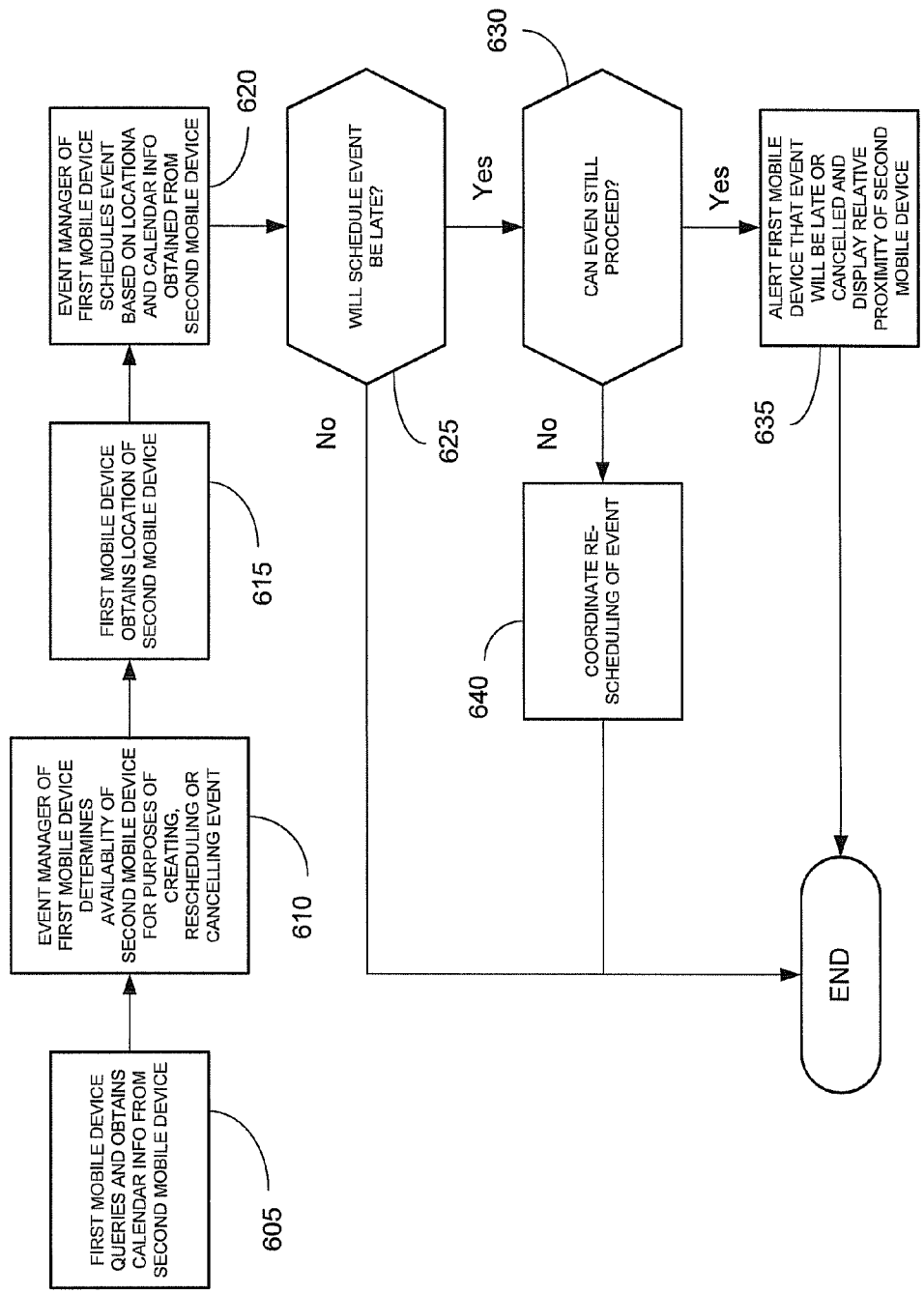
FIG. 6 is a block diagram of an inventive mobile device event scheduling system.

FIG. 6 illustrates a method 600 for mobile device event management. In step 605, a first mobile device, such as device 105 of FIG. 5, queries and obtains calendar information from a second mobile device, such as device 520. The user of device 105, for example, may want to schedule a meeting with the user of device 520. Step 605 can be performed, for example, by calendar query module 510. The calendar information may comprise any of the information typically found in. modem calendar applications, such as meeting location, date, and time. From this information, in step 610, the event manager of the first mobile device determines the availability of the second mobile device for purposes of creating, rescheduling, or canceling an event.

In step 615, the first mobile device obtains the location of the second mobile device. Step 615 can be performed, for example, by location query module 515. The location information may be obtained using a global positioning system ("UPS") and may take the form of latitude, longitude or location assist data including GPS data. This information is used to determine the relative proximity of the second mobile device to the first mobile device. In step 620, the event manager of the first mobile device schedules an event based on the location and calendar information obtained from the second mobile device.

Event management may include checking the status of and updating an existing event. Method steps 605-620 can be used by a first mobile device, for example, to determine whether the user of a second mobile device will be on time to a scheduled event. By considering the current time, the time that the event is scheduled and the relative proximity of the two devices, it can be determined whether a scheduled event will be late (step 625). If the second user will be late but the event can still proceed (step 630), the user of the first (querying) mobile device may be alerted that the scheduled event is going to be late or cancelled, and the relative proximity of the second mobile device can be displayed (step 635). If the event is going to be missed completely, in step 640, the two mobile devices can coordinate a re-scheduling of the event.

Not all steps of method 600 are performed in each instance. When a mobile device contacts another mobile device to schedule an event in the distant future, for example, steps 610 and 615 may be omitted since it is only necessary to determine the other device's availability. Its current location is not relevant so far in advance of the event. Likewise, a device may sometimes be interested only in the current location of another device, and not in its calendar information.

Method 600 may also be used to track the location/proximity of another mobile device. This location/proximity information may be displayed in a simple fashion, for example, by analyzing the longitude/latitude information of each party, scaling this information to the device display size, and then displaying relative proximity through the use of spaced dots. More complex displays may be used if device display and capability permits. Location boundaries may be established for a first mobile device, and an alert may be provided to a second mobile device if the first mobile device has left those boundaries. This can be extremely useful for monitoring children and pets, for example.

Figure 7:
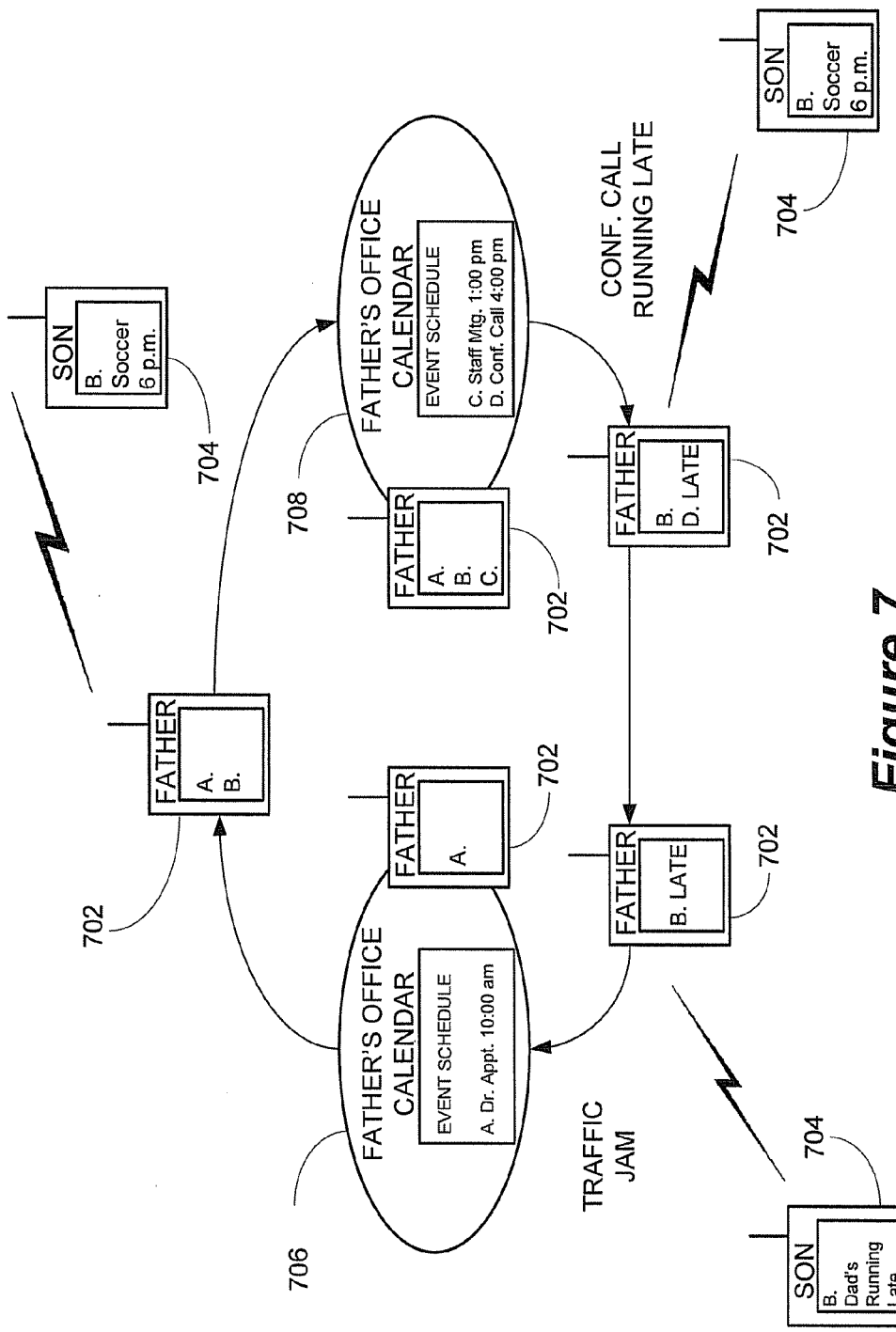
FIG. 7 is a flow diagram of an inventive method for mobile device event scheduling.

FIG. 7 demonstrates an example of method 600 in action. First mobile device 702 and second mobile device 704 are configured with event managers, location query modules and calendar query modules as described with reference to mobile device 105. In the example illustrated in FIG. 7, first mobile device 702 belongs to a father and second mobile device 704 belongs to his son. Before his morning commute, father synchronizes the calendar information stored in his mobile device 702 with the information stored in his home calendar 706. Home calendar 706 may be stored in, for example, in the father's home computer. Synchronization may be performed in a known matter over a cable or wireless link. In this example, one event is added to the calendar information stored in father's mobile device 702: event A, a doctor's appointment at 10:00 a.m. The calendars of both the father and his son may be ideally stored on cloud servers and accessed by their mobile devices.

On his way to work, father's mobile device 702 is queried by son's mobile device 704 for his availability to attend son's soccer game that night at 6 p.m. (i.e., step 605 in FIG. 6). From father's calendar information, son's mobile device determines that father is available (step 610) and the event ("B") is scheduled on father's mobile device (step 620).

When father arrives at his office, father again synchronizes the calendar information stored in his mobile device 702, this time with the information stored in his office calendar 708. Office calendar 708 may be stored in, for example, father's office computer. Synchronization may be performed in a known matter over a cable or wireless link.

Two more events are added to the calendar information stored in father's mobile device 702: event C: a staff meeting at 1:00 p.m.; and event D, a conference call at 4:00 p.m.

As the day progresses and son's soccer game draws near, son's mobile device 604 automatically queries and obtains the location of father's mobile device 602 to determine whether father will be on time for son's soccer game. If, for example, father's 4:00 p.m. conference call runs late, the location query module of son's mobile device 604 will note that father's mobile device 602 is still located at father's office, and can provide an alert on son's mobile device display that father will likely be late. Son's mobile device 604 may also modify its stored calendar information to reflect the fact that father will be late.

When father leaves his conference call, he becomes delayed in a traffic jam. The location query module of son's mobile device notes the location of father's mobile device and alerts son's mobile device that father is running even later or perhaps will miss the game entirely. Father's mobile device 602, conversely, can help father make the game by providing a suggestion for a less congested alternate route with real time directions and a visual map of the alternate route. Such information may be obtained from the Internet, for example. Son's mobile device 604 may display the relative proximity of father's mobile device 602 and, when son's location query module confirms that father's mobile device 602 is within a defined proximity (i.e., within five miles of the soccer field), it may cause son's mobile device to issue an appropriate alert/update (i.e., beeping, flashing, vibrating, etc.).

Father's mobile device event scheduler may also be configured to issue alerts to the mobile devices of all users with whom he is scheduled to meet in the event that father's schedule unexpectedly changes. If father is called away on an emergency business trip, for example, father's mobile device 602 may automatically alert son's mobile device 604 that father will miss son's soccer game entirely.

Real time location information is typically gathered using a locator network of fixed location devices, such as cellular base stations. In rural or obstructed urban areas, however, there may be no base station coverage. While a GPS reading may be possible in these areas, some locations are impenetrable even to a satellite, such as in the basement of a high-rise building. Thus, this invention contemplates extending the physical reach of real time event scheduling through the use of strategically placed locator networks where the locator networks may be wireless beacons such as WiFi transmitters that can be used by mobile devices to provide location information to users of the wireless device.

Figure 8:
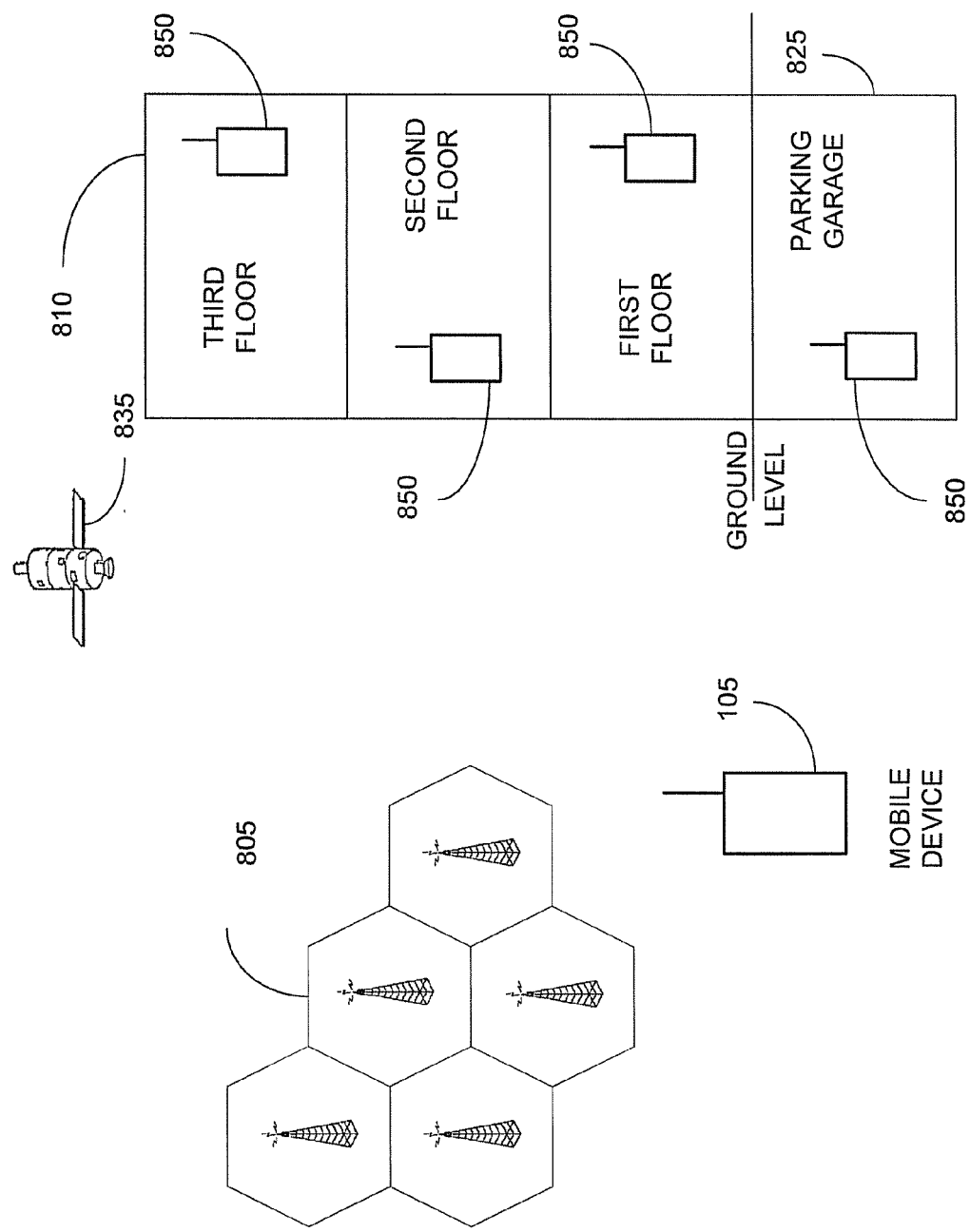
FIG. 8 is a diagram of an inventive network of fixed location devices for assisting in mobile device event scheduling and location.

FIG. 8 shows mobile device 105 passing through a series of overlapping wireless coverage areas, including cell network 805 and coverage provided by satellite 835. When mobile device 105 enters underground parking garage 825 of office building 810, it will likely lose the coverage provided by cell network 805. Cell or satellite coverage may or may not be available within the interior or portions of the interior of building 810.

A network of fixed location devices 850 is provided at locations within building 810 to extend the range of wireless coverage so that systems and methods for wireless device event scheduling can be effectively deployed in a locale. In FIG. 8, each floor of building 810 as well as parking garage 825 has a fixed location device 850. Fixed location devices 850 may be any intelligent device that can be networked together to enable end-to-end wireless communication with another device. They will typically employ a short range wireless technology such as wireless LAN, Bluetooth or the like. Fixed location devices 850 may be implemented in, for example an interconnected vending machine network that feeds location information on mobile device 105 back to the cellular network via a direct connection to the cell core or via a fixed location that is within the coverage area of network 805. As mobile device 105 transits building 810, its location is tracked by fixed location devices 850 and relayed back to the cellular network, enabling real time event scheduling and updating to continue even while device 105 is outside the coverage area of a traditional wireless network.

The use of fixed location devices in the context of an office building is just one example of the range extending aspects of this invention. In rural areas without cellular coverage, location and other information from one mobile device could be passed from car to car via fixed location equipment contained in the cars (via a wireless LAN module, Bluetooth or other short range technology) until one car carrying the information enters the range of a cellular network and the information is able to hop on to the network. VoIP could possibly be used to transmit voice signals in such situations as well.

Combining these two examples, a backpacker's mobile device might attempt to send location or calendar information in a rural area with no coverage and little auto traffic. The rural area might have, however, a vending machine equipped with a fixed location short range wireless device. The vending machine stores the backpacker's information until a passing car, also equipped with a fixed location device, receives the backpacker's data from the vending machine and then passes it to other cars, one eventually entering the coverage area of a cellular network.

Other types of valuable information might also be conveyed in this manner. In the event of an auto accident, for instance, emergency signals might be sent from car to car (via wireless LAN modules or the like) from the point of the accident to warn approaching cars of the accident ahead and to alert police and emergency personnel. Automobiles might also be equipped with a camera and appropriate computer hardware, including a video encoder as previously described. In the event of a car theft, live images of the thief as well as location information could be conveyed to law enforcement authorities in the manner described to help to quickly thwart the crime. Cameras may be configured to take photographs both inside and outside the automobile to assist in identification and location determination. Combined with the examples described above, a thief could not escape the law even by driving into a parking garage (assuming it is equipped with fixed location devices). In the example of an automobile, it should be noted that locator devices such as OnStar from OnStar Corp. could alternately be used to provide the location information.

The information gathered using the mobile device event scheduling and location determination techniques of this invention may be used in additional advantageous ways. A mobile device may be provided with appropriate software to track and store this calendar and location information, and to thereby gradually learn the habits, likes and dislikes of the device user. The device may learn, for example, when its user leaves for work, how the user drives to work and when and how the user returns home. The device may learn where and at what time the user likes to each lunch. Eventually, the mobile device can develop a knowledge-based "personality" that reflects the user's personality, and might even make suggestions to the user. If the user is in an unfamiliar city, for example, the device may know that the user likes Chinese food (from his many scheduled lunches at Chinese restaurants, for example), and may obtain information from the Internet about nearby Chinese restaurants and their locations. Based on this information, the device can suggest and schedule a lunch at a nearby Chinese restaurant.

This knowledge-based application of this invention can be extended to applications other than conventional mobile communication devices. A dog could be equipped with a wireless collar, for example, that tracks the dog's location and gathers data indicative of its health. Where warranted, the collar could automatically generate a recommendation that a vet appointment be scheduled, and query the owner's mobile device (as described) to recommend an appointment time. Similarly, an Alzheimer's patient could be tracked using a wirelessly equipped wristband to feed location information back to a caregiver's event scheduler, perhaps to know when a medication dose is next needed.

Figure 9:
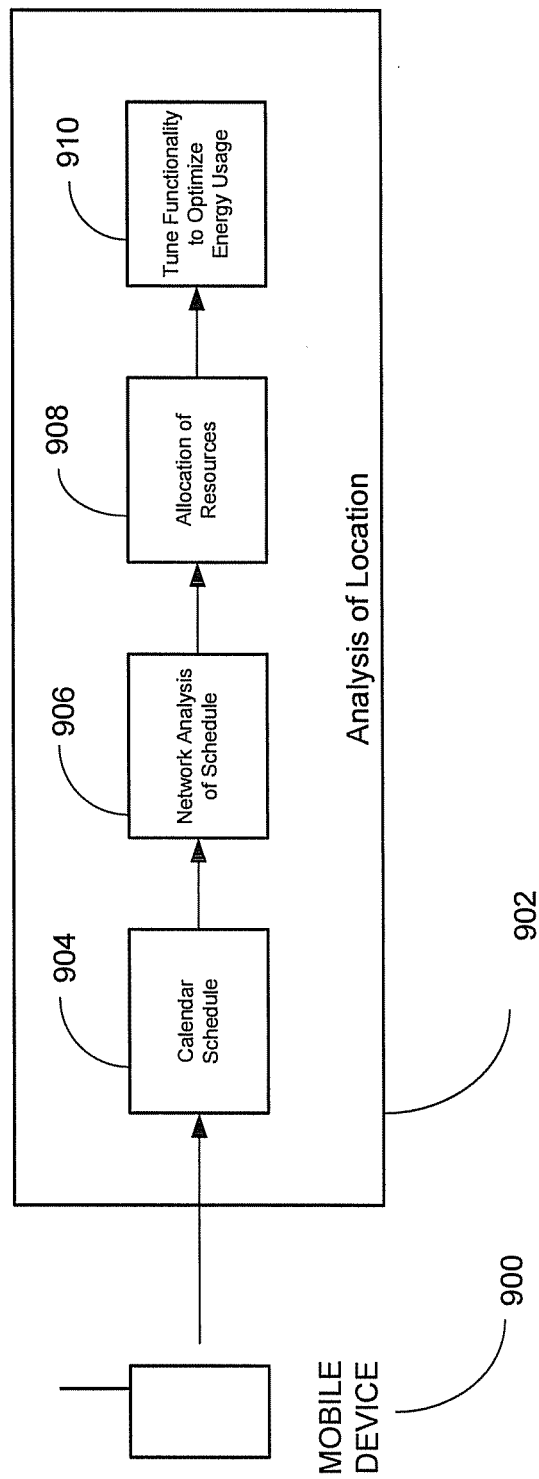
FIG. 9 is a block diagram of a mobile device's location analysis.

Power optimization of a mobile device may be achieved by prioritizing the use of available resources and functionality so that only necessary functionality is used or enabled. FIG. 9 is a block diagram illustrating the analysis of location for a mobile device to optimize power resources. Mobile device 900 performs an analysis of its location as shown in block 902. This begins by reviewing the calendar schedule of events stored on mobile device 900 (step 904).

The calendar schedule may be broadly defined and categorized as everything that a user does or interacts with within a given time period (e.g., an hour, day or week). Such a calendar schedule may include driving habits that are captured when the mobile device automatically connects with the Bluetooth connection in the user's vehicle so that the mobile device knows that the user is in their vehicle and plans to travel, for example, from home to school to drop off children, then off to a work location, then to a lunch appointment, then back to the work location, then back to the school to pick up children, and then back to home. Each time the user enters the vehicle, the mobile device detects that the user is in the vehicle and when compared to navigation map data, the mobile device can determine that the user is moving from one destination to another based on the user's typical habits at this particular time of day or by comparison to items specifically listed in the user's calendar schedule.

Along the way, the mobile device detects the routes traveled by the vehicle; how long the user is in the vehicle; how long the user takes for lunch; the location of the home, school, work locations, and etc. Coupled with this user specific data is network data that can be saved into memory of the mobile device and correlated to the calendar of events that occur throughout the user's day. Additional information may be voice activated information that a user may update by speaking into the mobile device, where the voice generated information updates the user's calendar. An example of such an update would be if a user were to speak to the mobile device and voice recognition application detects a change or update to the user's calendar. For example, the user tells the mobile device that they are diverting from their typical path to get gasoline for their vehicle or the user plans to stop for an hour at a particular restaurant.

Such network data may include carrier network information of the mobile device such as locations of base stations, types of network resources available, bandwidth availability, locations of low cost network resources such as free access WiFi networks or subscription networks where the user is a subscriber, etc. Additional information may be GPS location and movement patterns of the mobile device as well as the use of location beacons or other radio frequency resources that may be used by the mobile device to create an RF topographical map of the available resources at specific geographic locations. A neural network can be created of calendar events with real time data such as traffic or weather information along with static or semi-static information such as network resource availability (CDMA, GSM, LTE or other network resources such as WiFi, etc.).

The firmware operating on mobile device 900 analyzes the upcoming schedule of the user stored in the calendar, such as Microsoft Outlook, or on any comparable calendar scheduling system, including calendar scheduling systems stored on cloud based servers and accessible by a plurality of mobile and stationary computing devices of the user and trusted friends, family and contacts. From analysis of the schedule, mobile device 900 can plot its location throughout the day, and can determine what resources are required in order to optimize its functionality.

For example, most users are creatures of habit and have fairly routine, set schedules. The user leaves their house and usually travels the same direction every day to work, school or other events. At the end of a work day, a typical user travels the same direction returning home. By analysis of this typical routine and schedule, mobile device 900 can Plot the most likely direction of travel at specific times.

One power optimization routine that may be implemented on mobile device 900 is that when the user is still at home during the early morning, the mobile device downloads map information to memory in mobile device 900 while recharging. Likewise, the mobile device can upload network parameters that the mobile device detected throughout its travel pathways during a previous predetermined time period of hours, days or weeks. This download and uploading of network parameter data and navigation data can be scheduled and completed while the mobile device is operating on the home WiFi network where data costs are inexpensive. Once the user leaves the house, only limited data such as traffic update information may need to be downloaded at a higher bandwidth cost from the network that the mobile device is on.

In addition, because mobile device users are typically creatures of habit, the network resources along the route from the home to the office or first destination of the day are known. When the mobile device travels along a given path, it collects network information such as network types (public or private) that are available (e.g. GSM, CDMA, LTE, WLAN, etc.) as well as the availability of other networks such as those offered by competitors. These network parameters are stored in memory and compared to the user's calendar, and are allocated a frequency of use such that frequently traveled routes are stored for longer periods of time. Less frequent routes may be stored for an initial time and, if not traveled again by the user, replaced by newer route parameters.

By knowing these route parameters, the mobile device after analysis of the user's schedule can predict the necessary network resources throughout the day, and prioritize functionality. For example, since the locations of free or inexpensive network bandwidth resources are known, the mobile device can plan to download updates, map information or other data when present within such free or inexpensive network zones.

Another use of network resource optimization is the prediction of known dead zones along given routes. Once again, because typical users are creatures of habit, mobile device 900 can learn the location of these dead zones and download more data just before the user reaches the dead zone. When the user exits the dead zone and re-establishes network connectivity, the download of information can then resume. If the user is on a telephone call, and the dead zone lasts for a short period of time (e.g. 1-5 seconds), the mobile device can store the conversation so that when the mobile device reconnects the stored conversation is transmitted to the user and loss of information is minimized. The same applies if the dead zone occurs when the other party is speaking. In such a scenario, the network or base station can store several seconds of conversation while the user is in the dead zone and transmit to the mobile device once connectivity is restored. To get the conversation back in sync, the speech may be speeded up once replayed to the listener so that as seamless of a conversation can be achieved. In summary, when a mobile device user approaches a carrier network known dead zone of relatively short duration (e.g. 1-5 seconds) voice and data transmissions are buffered until the connection is re-established after passing through the dead zone, and the buffer is then released in a faster playback mode so that the speech is synched back up to real time.

If the dead zone lasts longer, (e.g. 5-10 seconds or more), the mobile device may pause, generate a pleasing tone or otherwise signal the user engaged in a telephone conversation of the loss of connectivity, and then attempt to re-establish connectivity upon exiting the dead zone. This eliminates the need of the users to hang up and redial each other. If the dead zone is known to last an intermediate amount of time (e.g. 10-30 seconds), then the mobile device may end the call or generate a tone indicating a loss of signal until the mobile device and network are able to reconnect. Most mobile devices can search all channels but use significant battery resources by doing so. However, when the mobile device knows the available network resources, and that the device will reconnect to the network in a specific time, this information can be used to smooth out solutions and prevent calls from actually ending only to be redialed by the users.

Referring again to FIG. 9, by analyzing the calendar schedule (step 906), the mobile device and network can allocate resources optimizing power utilization in step 908. A major use of battery power in a mobile device is the search for network resources. However, once a user passes through a given area, the mobile device can store network resource information and then only inquire as to available network resources periodically instead of current systems which constantly inquire about the availability network resources. By reducing these inquiries, the mobile device can tune the functionality so that only those required functions are used when resources and connectivity are available (step 910). Searching and turning on and off the RF processor (transmit and receive chain) consumes significant power. Once the mobile device knows the availability of network resources it can put some of its functionality into standby or sleep mode to reduce energy consumption. When the mobile device enters into an area where network resources are available, it can then enable the functionality.

For example, along a given route frequently taken by a user, a WiFi hot spot is located at a place twenty minutes from the starting point and thirty minutes from the final destination. This WiFi hot spot is a coffee shop that is frequented by the user. Thus, the mobile device's WiFi functionality is placed into standby or sleep mode until the mobile user approaches the WiFi hot spot. The mobile device knows the location of the WiFi hot spot from the location of the user via the navigation function on the mobile device. Once the WiFi hot spot is within range, WiFi functionality is enabled and scheduled downloads of data can be carried out over the less expensive WiFi network resource, such as updates on traffic congestion along the remaining thirty minute route from the coffee shop to the final destination. Once the mobile device detects that the WiFi hot spot has been left, it can automatically power down WiFi functionality, thus saving battery life since this functionality will not be turned back on until the user reaches their final destination.

Figure 10:
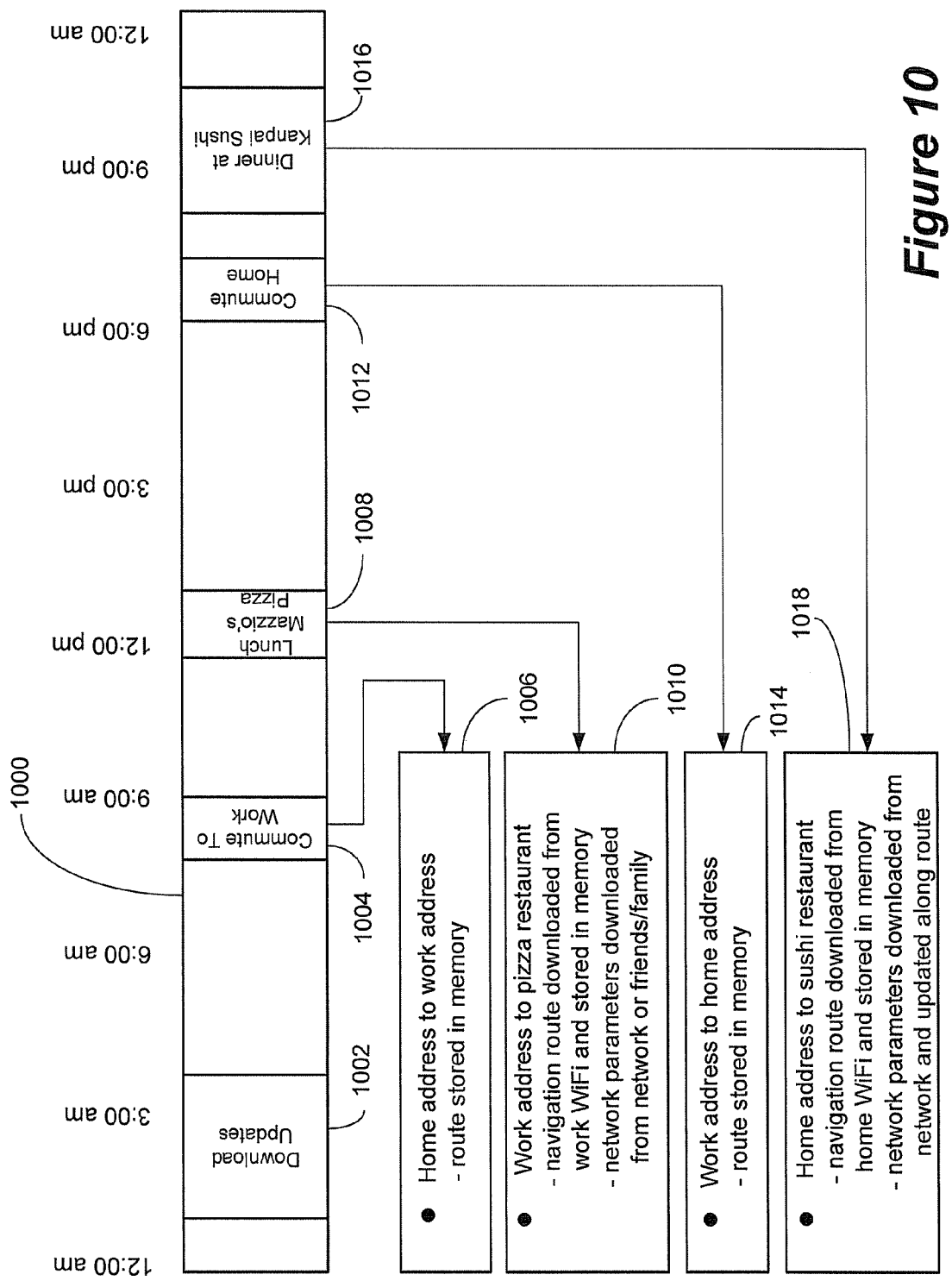
FIG. 10 is a block diagram of a mobile user's schedule with network parameters gathered and stored in memory.

FIG. 10 is a block diagram of a mobile user schedule with network parameters gathered and stored in memory. Schedule 1000 includes data regarding the appointments and events of a given day or time period. If an address associated with an event or appointment is not included in schedule 1000, the mobile device may compare addresses in the mobile user's address book or may prompt the user for the address of the appointment. When the mobile device has acquired the address, appropriate navigation data can be downloaded. The mobile device can compare an intended path with network parameters already stored in the memory of the mobile device. If no network parameters exist in the memory that cover the intended path, network parameters for the intended path can be downloaded or obtained from friends, family members or third parties.

Users are creatures of habit. The mobile device can download navigation route information and related network parameters for the expected travel paths for an upcoming day at a convenient and inexpensive time (e.g. in early morning over an inexpensive WiFi home network—see timeslot 1002). This information is stored in the memory of the mobile device, such that when the user leaves for work and starts their commute (timeslot 1004), the network parameters are already downloaded and stored in mobile device memory (block 1006).

When the user leaves for a pizza lunch (timeslot 1008), once again the navigation data and network resources are already downloaded into the mobile device memory (block 1010). If the pizza restaurant is at a location that the user has never visited, the mobile device could get the network parameters from the network or from other mobile users. When the user starts their commute home (timeslot 1012), the network parameters are once again already stored in mobile device memory (block 1014) since this is a route that is frequently taken by the user. Once the user is home, if the user decides to go out to dinner (timeslot 1016), the navigation data and network parameters to the restaurant can be downloaded from the inexpensive home network and then updated en route if needed (block 1018).

Figure 11:
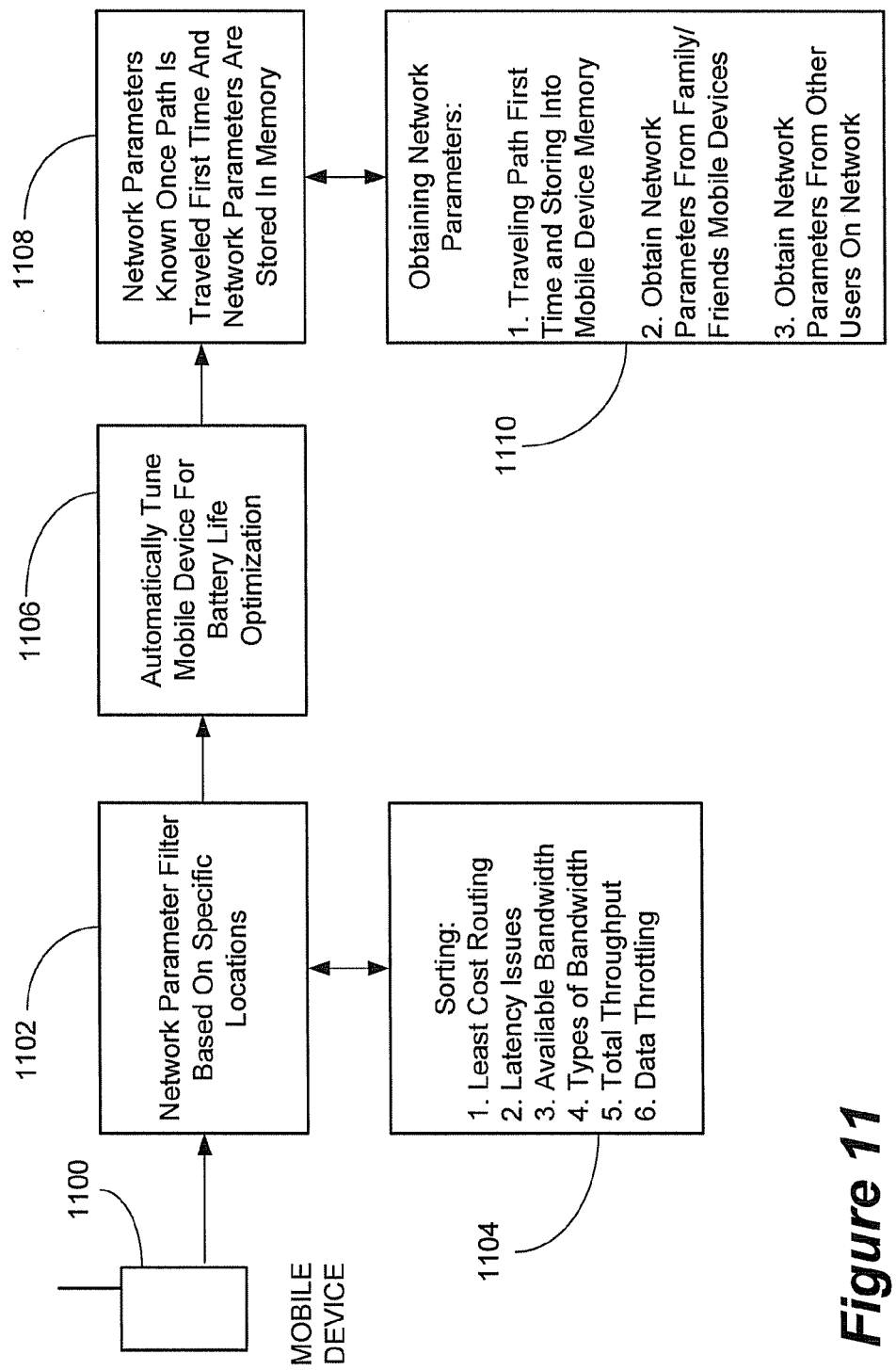
FIG. 11 is a block diagram of an analysis of a mobile device's network parameters tuned for optimum battery life.

FIG. 11 is a block diagram of an analysis of a mobile device's network parameters tuned for optimum battery life. Mobile device 1100 has a network parameter filter 1102 based on specific locations that can sort through a variety (of selection or priority function criteria) of functions 1104 such as (1) least cost routing; (2) latency issues; (3) available bandwidth; (4) types of bandwidth e.g. CDMA, GSM, LTE, etc.; (5) total throughput; and (6) data throttling. Mobile device 1100 can automatically tune itself for battery life optimization (block 1106). The network parameters are detected the first time that mobile device travels a path and stored in the mobile device memory (block 1108).

As additional paths are traveled, mobile device 1100 detects and stores the network parameters for later recall. Once a set number of paths are stored in memory (e.g. 50, 100, 500, etc. where the limit is determined by the size of the memory storage area), the mobile device can sort the paths that are less frequently used and prioritize those network parameters so that as new paths are traveled, older stored paths that are not used are replaced by newer paths.

Network parameters 1108 that are correlated to paths taken by the user may also be correlated to the user's schedule stored in the user's calendar on the mobile device.

For example, if a user has on their calendar a trip across town to a location that the mobile device has never been to before, the mobile device has the option of downloading and storing the network parameters from an online website. These network parameters may include: (1) bandwidths available; (2) types of networks the mobile device will encounter along the path traveled (e.g. CDMA, GSM, LTE, etc. network systems); (3) data on other service networks where the mobile devices will roam on competitor carrier networks; (4) potential network congestion areas; (5) the location of lower cost WiFi hot spot locations; (6) navigation data; (7) and other relevant data that would support the mobile device's optimization of mobile device functionality so that resources can be powered down and placed in sleep mode or standby mode. For example, the mobile device typically always searches for the most preferred systems (RF and channel changes) and this searching consumes a significant amount of power. In a CDMA network, first the mobile device checks for an RF channel (A or B side) and then checks the 25 sub-channels for RF channels A or B. This step determines which RF channel is available from the assigned RF channels.

If these network parameters are not available to the mobile device from the network, the mobile device may be able to obtain the network parameters and other relevant data regarding the desired path from other mobile devices (block 1110). For example, if the user calendar indicates that the mobile device will travel from point A to a new destination point B, the mobile device may seek the network parameters from the network carrier. If the network parameters are not available from the carrier, the mobile device may query and seek this information from other mobile devices that may have some or all of the network parameter information because the other mobile device has previously traveled all or part of the route from point A to point B.

Figure 12:
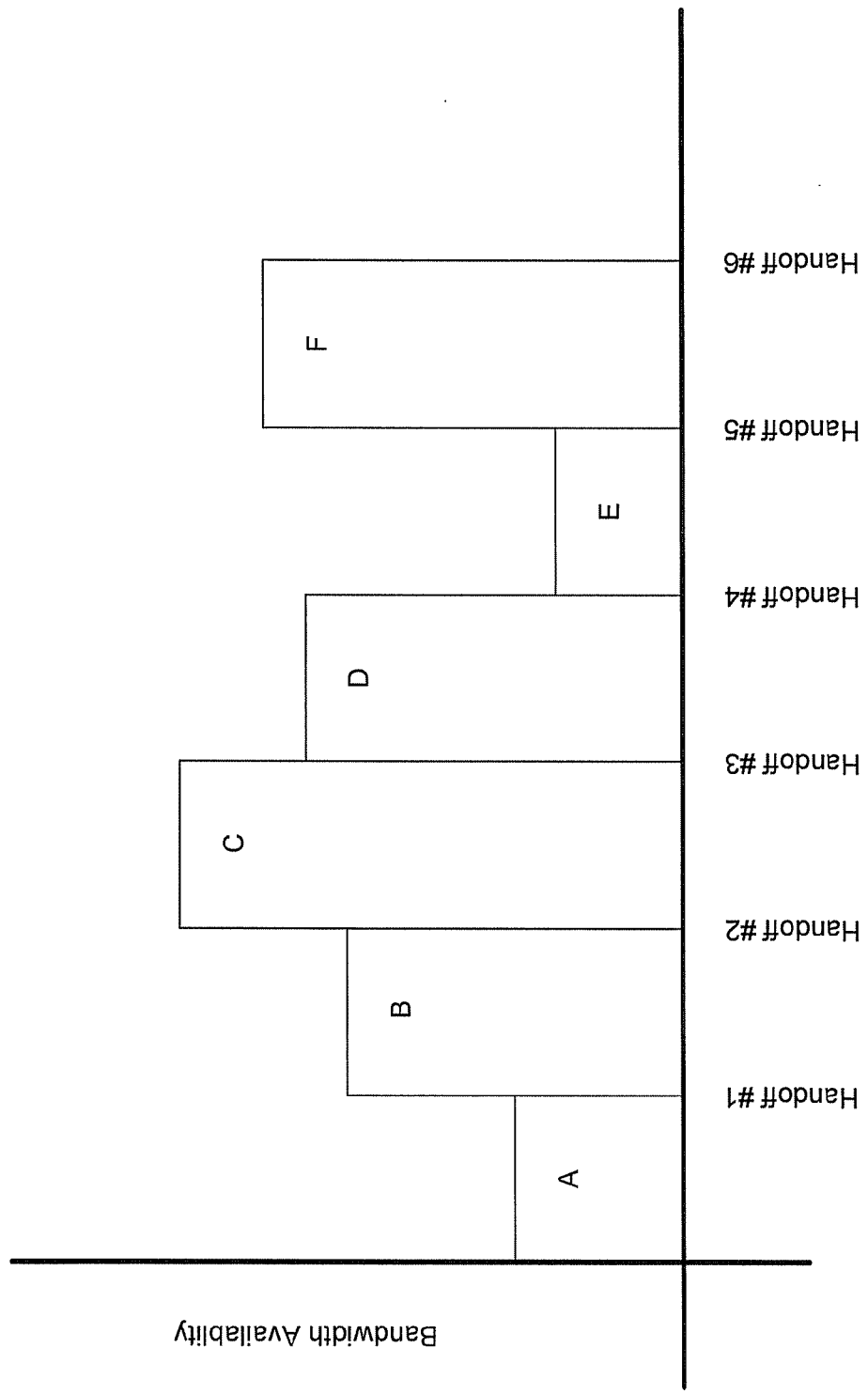
FIG. 12 is a flow diagram of a mobile device's bandwidth availability during handoffs between zones of base station coverage.

FIG. 12 is a flow diagram of a mobile device's bandwidth availability during handoffs between zones of base station coverage. One of the network parameters along a given path from point A to point B is bandwidth. In FIG. 12, there are six handoffs A, B, C, D, E and F along the route from point A to point B. At each handoff, the bandwidth is sometimes higher and sometimes lower. When the mobile device knows these network parameters ahead of time, it can schedule downloads of data such as navigation updates in traffic congestion areas in zones where the bandwidth is higher, e.g. areas C and D, while restricting navigation or email downloads in zones where bandwidth is restricted, such as area E.

Figure 13:
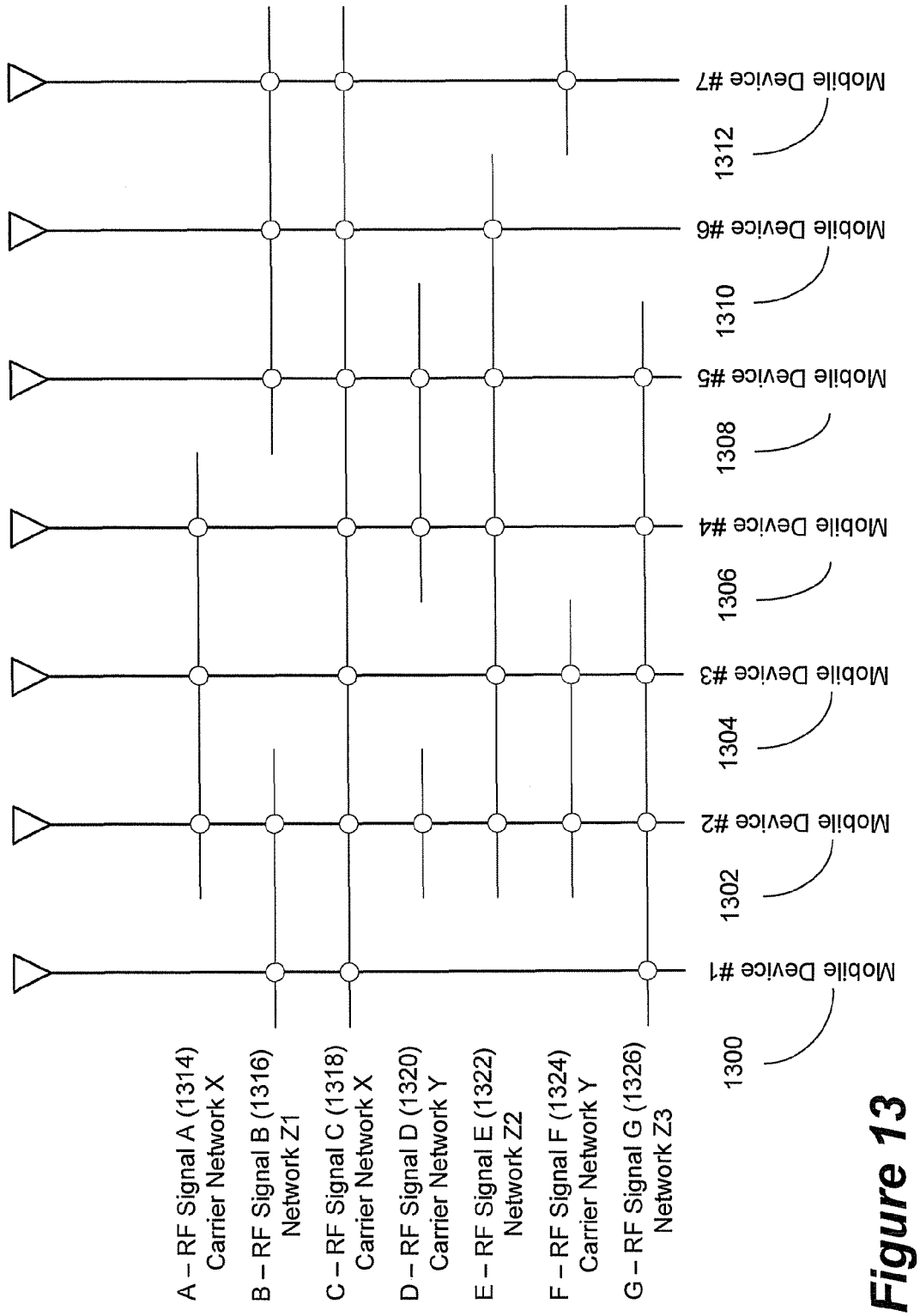
FIG. 13 is a diagram illustrating a plurality of mobile devices receiving a plurality of RF signals.

FIG. 13 is a diagram illustrating a plurality of mobile devices receiving a plurality of RF signals. Mobile device #1 (1300), mobile device #2 (1302), mobile device #3 (1304), mobile device #4 (1306), mobile device #5 (1308), mobile device #6 (1310), and mobile device #7 (1312) are all independent mobile devices operating on a plurality of mobile device carrier networks. All seven of the mobile devices are located in different geographic areas and thus are capable of detecting all or some of the RF Signals A-G (1314, 1316, 1318, 1320, 1322, 1324 and 1326).

As independent mobile devices, these mobile devices are capable of detecting and operating on a plurality of networks, some of which are operated by the mobile device's carrier and some are operated by competitor carriers. For example, RF Signal A (1314) and RF Signal C (1318) may be operated my carrier network X. RF Signal D (1320) and RF Signal F (1324) are operated by carrier network Y. Meanwhile, RF Signal B (1316), RF Signal E (1322) and RF Signal G (1326) are operated by independent networks Z1, Z2 and Z3 respectively.

At a particular time "t":

Mobile device #1 (1300) detects RF Signal B (1316), RF Signal C (1318) and RF Signal G (1326).

Mobile device #2 (1300) detects RF Signal A (1314), RF Signal B (1316), RF Signal C (1318), RF Signal D (1320), RF Signal E (1322), RF Signal F (1324), and RF Signal G (1326).

Mobile device #3 (1300) detects RF Signal A (1314), RF Signal C (1318), RF Signal E (1322), RF Signal F (1324), and RF Signal G (1326).

Mobile device #4 (1300) detects RF Signal A (1314), RF Signal C (1318), RF Signal D (1320), RF Signal E (1322), and RF Signal G (1326).

Mobile device #5 (1300) detects RF Signal B (1316), RF Signal C (1318), RF Signal D (1320), RF Signal E (1322), and RF Signal G (1326).

Mobile device #6 (1300) detects RF Signal B (1316), RF Signal C (1318), RF Signal D (1320), and RF Signal E (1322).

Mobile device #7 (1300) detects RF Signal B (1316), RF Signal C (1318), and RF Signal F (1324).

Mobile device #1 (1300), mobile device #2 (1302), mobile device #3 (1304) and mobile device #4 (1306), are customers of carrier network X and all have intelligent logic that searches out the most optimum network for operation. In addition, these four mobile devices also incorporate a pricing model that allows the mobile device to search out the most optimum network and filter the choice based on the best pricing of the networks X, Y and independent networks Z1, Z2 and Z3.

In this scenario, mobile device #2 (1302) can detect RF Signals A-E (1314, 1316, 1318, 1320, 1322, 1324 and 1326). Implementing the logic for determining the most optimum network, mobile device #2 may determine that RF Signal #B (1316) is the best signal for the transmission and reception of telephone calls (e.g. highest signal strength and quality). However, when mobile device #2 (1302) is not engaged in a voice call, implementation of the cost pricing mobile would allow mobile device #2 (1302) to transition to RF Signal G (1326) which is a free WiFi service operated by independent network provider Z3. Such an implementation of carrier aggregation (e.g. increasing data throughput by adding physical RF channels and physical data channels) would allow carrier X to off load the data traffic associated with mobile device #2 (1302) to a no cost WiFi service thus freeing up costly bandwidth on carrier X's network.

Mobile devices #5 (1308), #6 (1310) and #7 (1312) are customers of carrier network Y. Conversely, mobile device #7 (1312) operating on carrier network Y does not implement any optimum network modeling nor does it operate any best pricing models. Instead, carrier network Y drives all its mobile devices to its network first and if carrier network Y's resources are not available, only then will the mobile device operate on a competitor's network. Thus, mobile device #7 (1312) will drive its voice and data traffic to RF Signal F (1324) even though data could be offloaded to a free WiFi service operated by RF Signal B (1316) by independent network Z1. Likewise mobile device #6 (1310) operating on carrier network Y fails to find any carrier Y resources so it roams to competing carrier X and permits calls and data to be implemented at the highest cost on carrier network X's equipment so mobile device #6 (1310) is directed to RF Signal C (1318) when the voice and data should be routed to free or low cost WiFi signals RF Signal B (1316) or RF Signal E (1322). Additional carrier logic could offload mobile device traffic based on characteristics of the data, type of technology, carrier network resources, planned outages on carrier network, latency, bandwidth throughput, etc.

Figure 14:
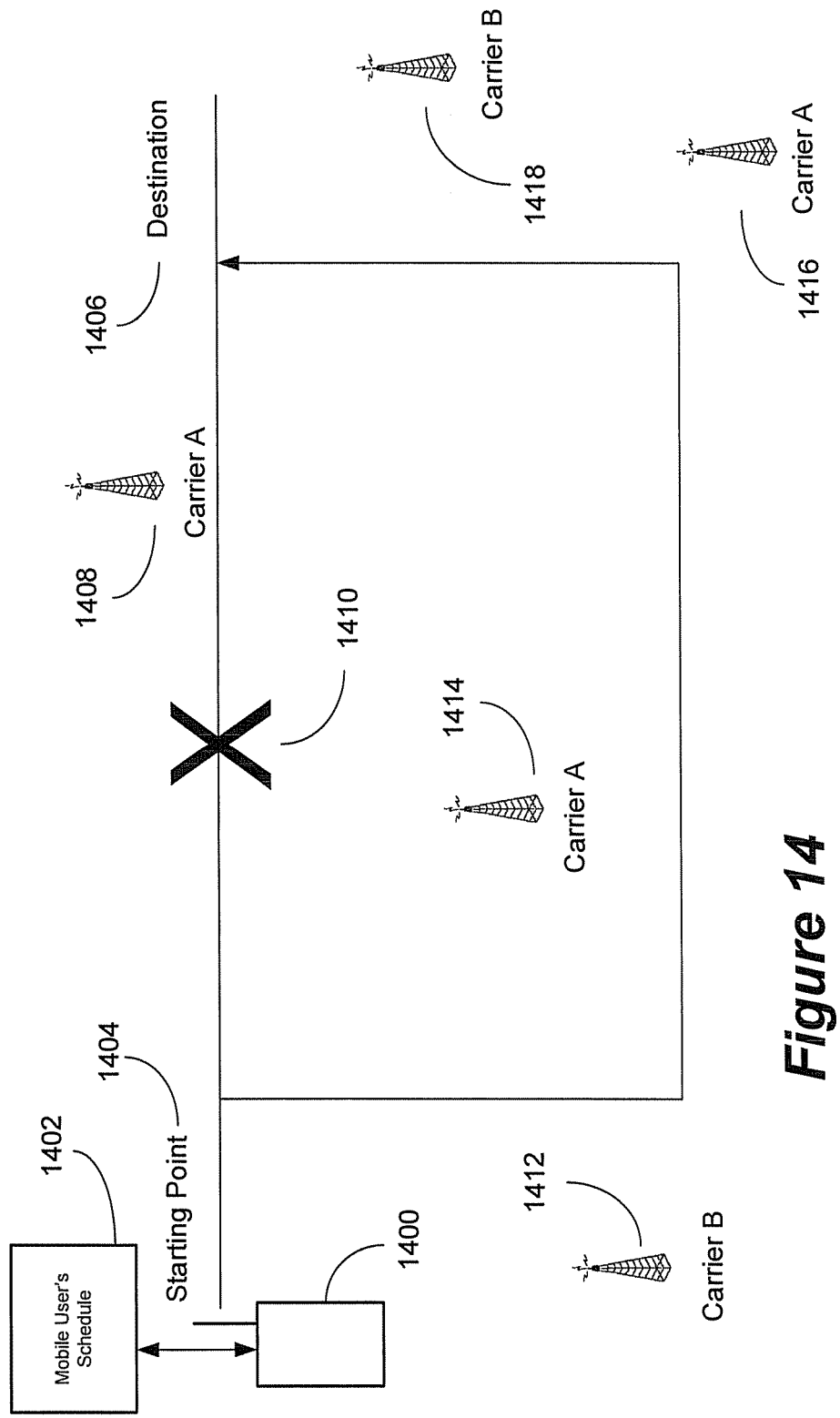
FIG. 14 is a diagram of a mobile device's detection of new network coverage and storage into memory of the network resources and their location.

FIG. 14 is a diagram of a mobile device's detection of new network coverage and storage into memory of the network resources and their location. Mobile device 1400 analyzes user schedule 1402 and detects that the user is scheduled to travel from starting point 1404 to destination 1406. Along path 1410, the user will access base station 1414 and base station 1408 belonging to the user's network carrier A.

Before reaching destination 1406, an obstacle such as a traffic accident occurs blocking the intended travel path 1410 (indicated by "X"). To save time, the user is automatically re-routed along an alternative path by the mobile device's navigation system. Once the user accepts the alternative path, mobile device 1400 downloads the new network parameters. In this instance, mobile device 1400 receives information on base station 1412, base station 1416 and base station 1418. The information transmitted by the carrier A network to mobile device 1400 includes information identifying that base station 1412 and base station 1418 are another carrier's network ("Carrier B") having costly network roaming charges. Thus, before the mobile device leaves network A, network parameters are uploaded to mobile device 1400 and while in network B, data downloads such as email and traffic information may be blocked.

Figure 15:
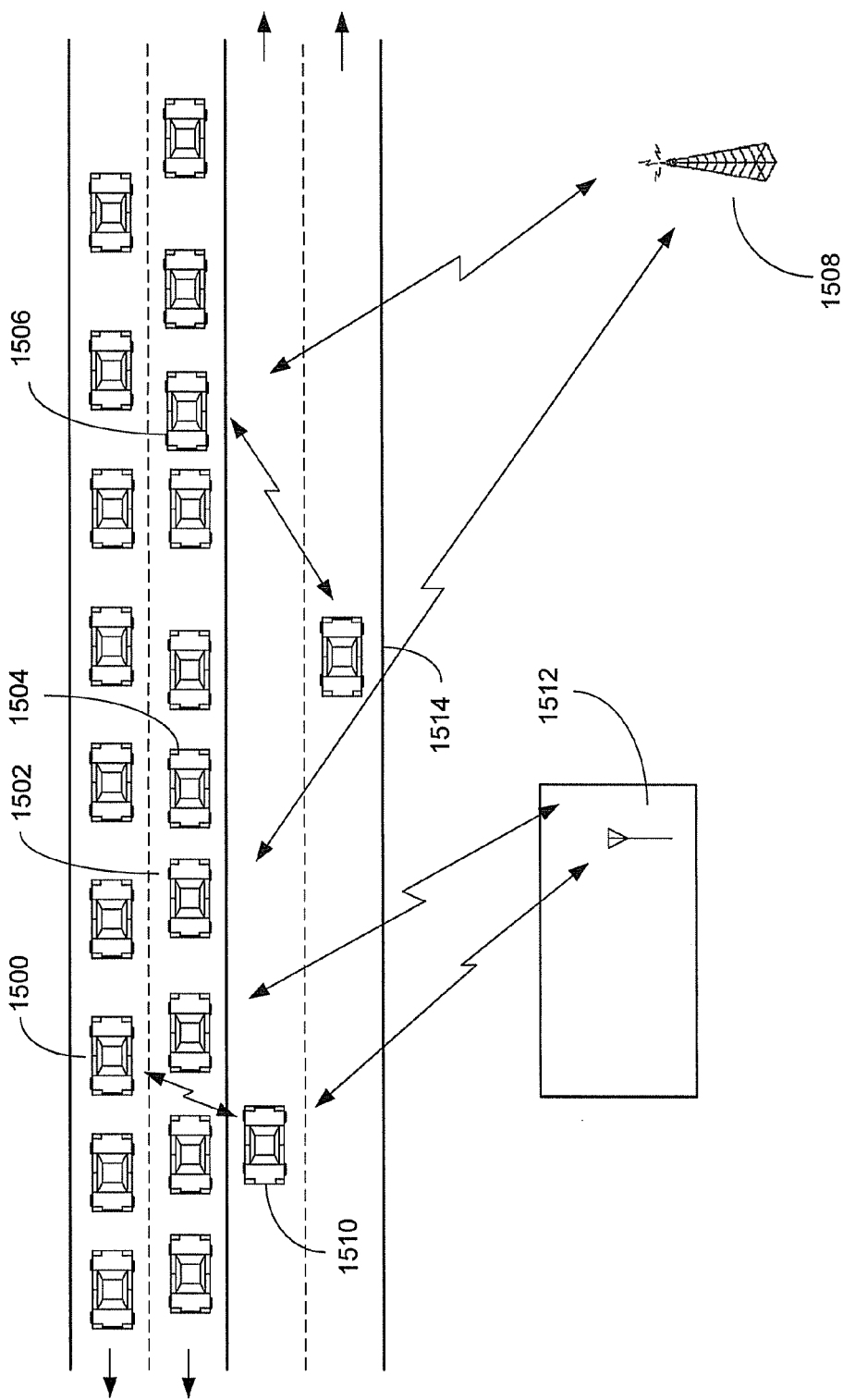
FIG. 15 is a block diagram illustrating a mobile device receiving information and updates via a wireless network within a building, the carrier network and from other users.

FIG. 15 is a block diagram illustrating a mobile device receiving information and updates via a wireless network within a building, the carrier network and from other users. Mobile devices 1500, 1502, 1504 and 1506 are shown carried by separate users traveling in different vehicles that are stuck in traffic. Mobile devices 1502 and 1504 are traditional mobile devices that rely on their carrier network for resources and are constantly in search mode using up precious resources searching out their mobile device's carrier network resources.

Conversely, mobile devices 1500 and 1506 are capable of seeking out their carrier's network resources or seeking out information and resources from other sources. For example, mobile device 1500 is capable of seeking out information regarding the length of the traffic delay from carrier network resources 1508 or from vehicles 1510 that have recently passed by the traffic hold up. Likewise, mobile device 1500 can obtain information or download data such as updates from a low cost or no cost free WiFi signal detected from local business 1512. Similarly, mobile device 1514 can obtain from mobile device 1506 information regarding the location of carrier network resources in the direction of travel of mobile device 1514. Thus, mobile device 1514 may be able to obtain an update of available network resources ahead, thereby reducing the amount of searching for network resources that is required and improving the battery life of mobile device 1514.

Figure 16:
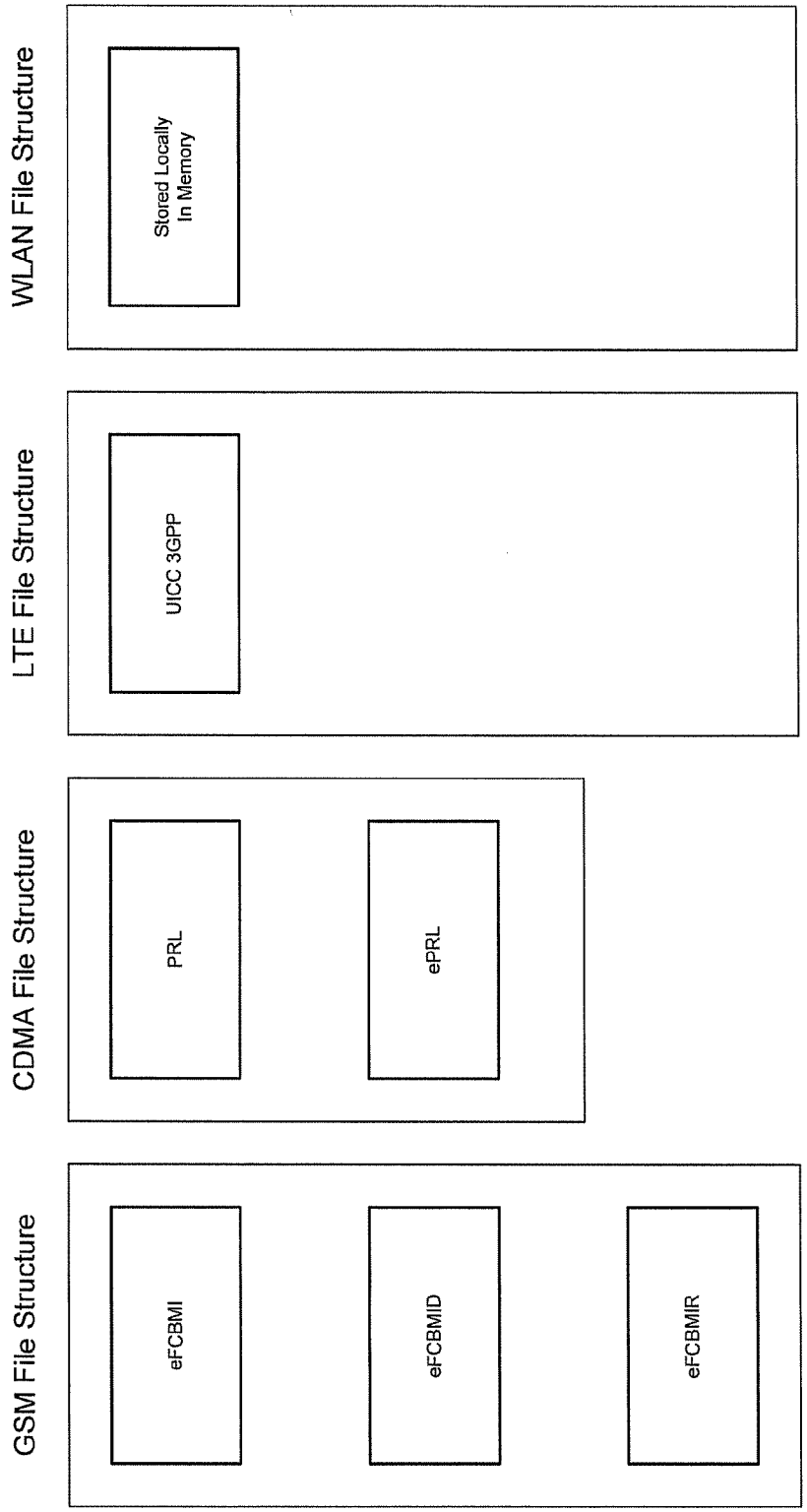
FIG. 16 is a block diagram of the file structure for GSM, CDMA, LTE and WLAN networks.

FIG. 16 is a block diagram of the file structures for GSM, CDMA, LTE and WLAN networks. As shown, network parameters for a GSM network are stored in eFCBMI, eFCBMID and eFCBMIR files. In a CDMA environment, the network parameters are stored in PRL and ePRL files. In an LTE environment, network parameters are stored in UICC files. In a WLAN environment, the network parameters are stored in opt in files (locally in memory).

Figure 17:
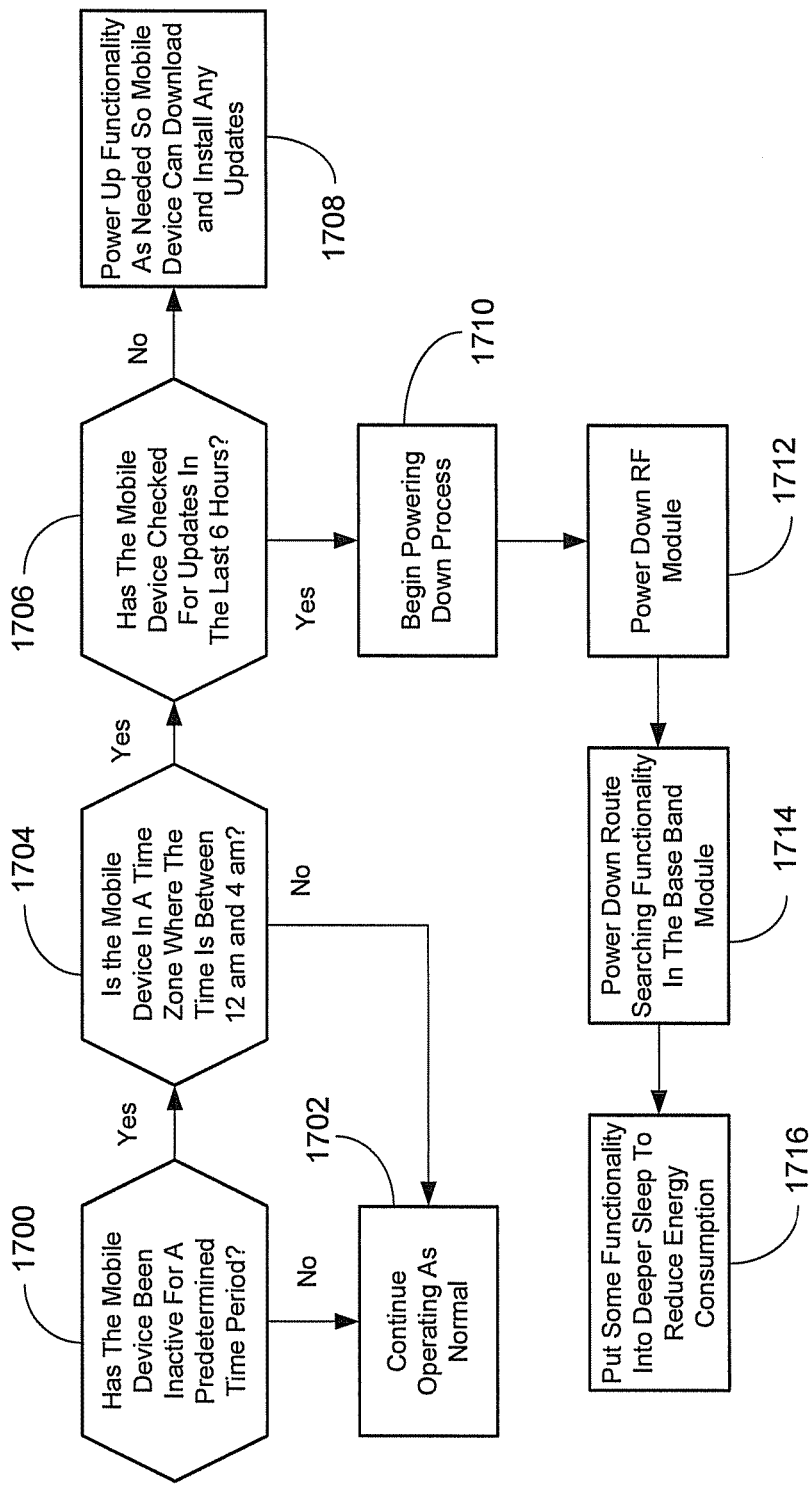
FIG. 17 is a flow chart illustrating the optimization of downloading and storing updates during a mobile device's period of inactivity during battery recharging.

FIG. 17 is a flow chart illustrating optimization of downloading and storing updates during a mobile device's period of inactivity during battery recharging. The mobile device determines in step 1700 whether it has been inactive for a predetermined period of time. This can be determined by checking internal sensors within the mobile device to determine if the mobile device has been moved during a specific time period, e.g. movement detected during the last two hours. If movement was detected (step 1700—No), the mobile device continues to operate as normal (step 1702). If no movement was detected (step 1700—Yes), then the mobile device determines in step 1704 whether it is in a certain time range of a local time zone (e.g. eastern standard, central standard, pacific standard, etc.), such as between 12 and 4 a.m. If the mobile device is not in a local time zone in this range, then the mobile device continues to operate as normal (step 1702). If the mobile device is in a local time zone in the predetermined range (step 1704—Yes), then it assumes the user is sleeping and can check for downloading updates and other information such as a comparison of the user's schedule for the day and applicable network parameters.

The mobile device determines in step 1706 if it has checked for updates in the last predetermined time period, e.g. checked for updates in the last six hours. If the response is no, then the mobile device powers up the necessary functionality to begin downloading any available updates (step 1708). If the response is yes, the mobile device begins its powering down process to either save battery life or if recharging to minimize the use of network resources by periodically pinging the network (step 1710). The power hungry RF module is powered down (step 1712), other functionality such as route searching in the base band module is also powered down (step 1714), and other functionality is put into deep sleep mode (step 1716) until the mobile device detects movement, e.g. the user has picked up the device at the start of a new day.

Since the mobile device knows the estimated distance to the next servicing area that is preferred, it does not need to rescan for available network resources until this known distance has been traveled, such that the mobile device is in close proximity to the new servicing area. These servicing areas are governed by Metropolitan Servicing Areas ("MSAs") and Rural Servicing Areas ("RSAs"). The rescanning process can be adjusted as more information is obtained. Each trip to a new destination provides another opportunity to capture and provide more accurate network parameter information, providing essentially a self-learning network where mobile devices take advantage of the fact that people are creatures of habit and where network resources can be gathered and network resource information exchanged with other mobile device users, so that mobile device resources can be powered down or not searched continuously since the network parameters are mapped out and stored in the mobile device's memory.

Figure 18:
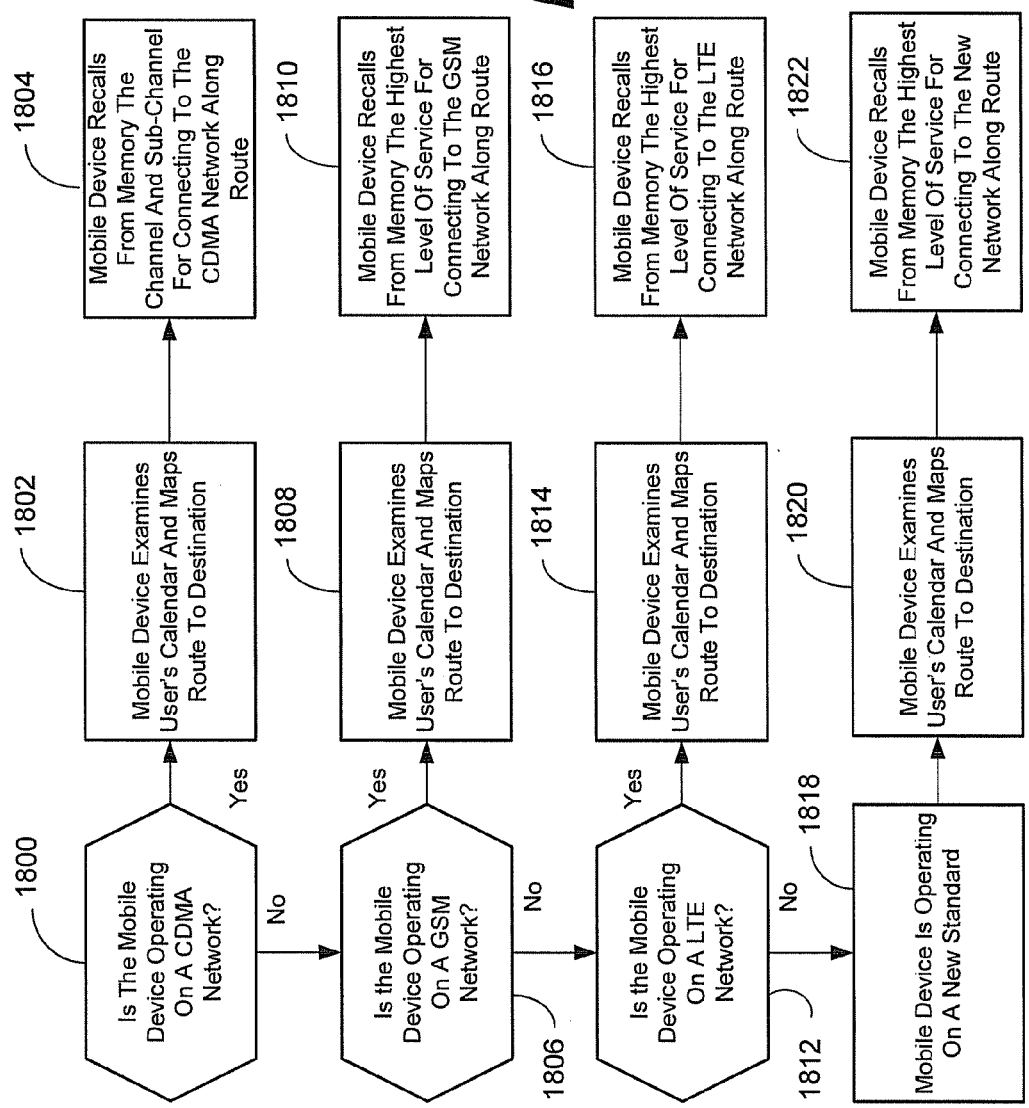
FIG. 18 is a flow chart illustrating the recall of the highest level of service for various networks that a mobile device may detect.

FIG. 18 is a flow chart illustrating the recall of the highest level of service for various networks that a mobile device may detect. In step 1800, the mobile device determines whether the mobile device is operating on a CDMA network. If the response is yes, in step 1802, the mobile device examines the user's calendar and maps a route to the destination. The mobile device then recalls from memory the channel and sub-channel for connecting to the CDMA network along the route (step 1804).

If the mobile device is not operating on a CDMA network (step 1800—No), then the mobile device inquires in step 1806 whether it is operating on a GSM network. If the response is yes, in step 1808, the mobile device examines the user's calendar and maps a route to the destination. Then, the mobile device recalls from memory the highest level of service for connecting to the GSM network (step 1810).

The mobile device is capable of learning network parameters as it moves into new geographic areas. As the mobile device moves into new geographic areas it detects the mobile device's carrier network equipment as well as other networks that allow the mobile device to roam on a third party's network. In addition, the mobile device can detect low cost or free network access points such as WiFi hotspots where the mobile device can achieve low or no cost network access. The mobile device can then store the carrier's network parameters; the parameters of other networks where the mobile device can roam; and low or no cost hotspot network access information such as WiFi hotspot parameters, thus building an intelligent database that allows the mobile device to create optimal use of network bandwidth.

The mobile device can store, discard or save the network parameters based on frequency of use or potential for future use by the mobile device user. For example, by accessing the mobile device calendar, software operating on the mobile device can determine if the mobile device user doesn't want to be disturbed; can accept an interruption from a certain class of users (e.g. user's boss, spouse, children, or some other predetermined class of known users); or will allow any incoming call, email or text message. As an example, the mobile device may learn that the user is a student and will block all incoming calls when the user is in a class. Or, the mobile device may allow all incoming calls, but block all text messages during particular times of the day such as when the user is driving. Once the user arrives at their destination, the previously blocked text messages will be delivered.

Referring again to FIG. 18, if the mobile device is not operating on a GSM network (step 1806—No), the mobile device inquires in step 1812 whether it is operating on a LTE network. If the response is yes, the mobile device examines the user's calendar and maps a route to the destination (step 1814), and then recalls from memory the highest level of service for connecting to the LTE network (step 1816).

If the mobile device is not operating on a LTE network (step 1812—No), the mobile device inquires in step 1818 whether it is operating on another network standard. If the response is yes, the mobile device examines the user's calendar and maps a route to the destination (step 1820), and recalls from memory the highest level of service for connecting to the LTE network (step 1822).

Figure 19:
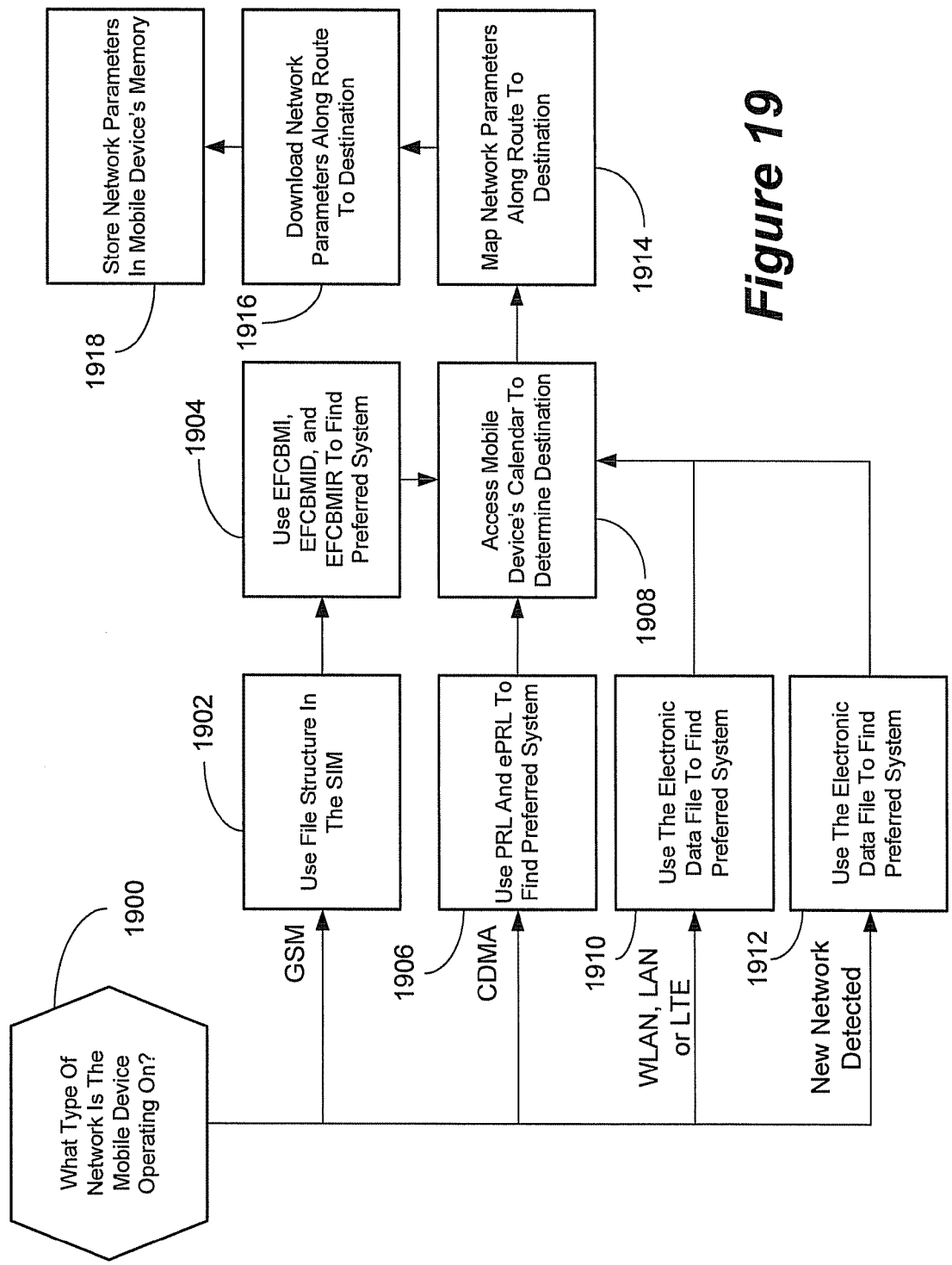
FIG. 19 is a flow chart illustrating the use of a file structure to map network parameters as they are stored in the mobile device's memory.

FIG. 19 is a flow chart illustrating the use of a file structure to map network parameters as they are stored in the mobile device's memory. The mobile device determines the type of network that it is operating on in step 1900. If the mobile device is operating on a GSM network, it uses the file structure in the SIM (step 1902). Specifically, the mobile device uses the EFCBMI, EFCBMID and ERCBMIR file types to find the preferred system (step 1904). The mobile device then accesses the calendar in step 1908 to determine the destination. If the mobile device detects a CDMA network, it uses the PRL and ePRL file types to find the preferred system (step 1906). If the mobile device detects a WLAN, LAN or LTE network, it uses the files stored in memory or a UICC file type (LTE) to find the preferred system (step 1910). If a new network is detected, the mobile device accesses the electronic data file to find the preferred system (step 1912). The CDMA, WLAN, LAN, LTE and unknown networks access the user's calendar in step 1908 to determine the destination. The mobile device then maps network parameters along the route to the destination (step 1914), and downloads network parameters along the route to the destination (step 1916). These network parameters are stored in the mobile device memory (step 1918).

Figure 20:
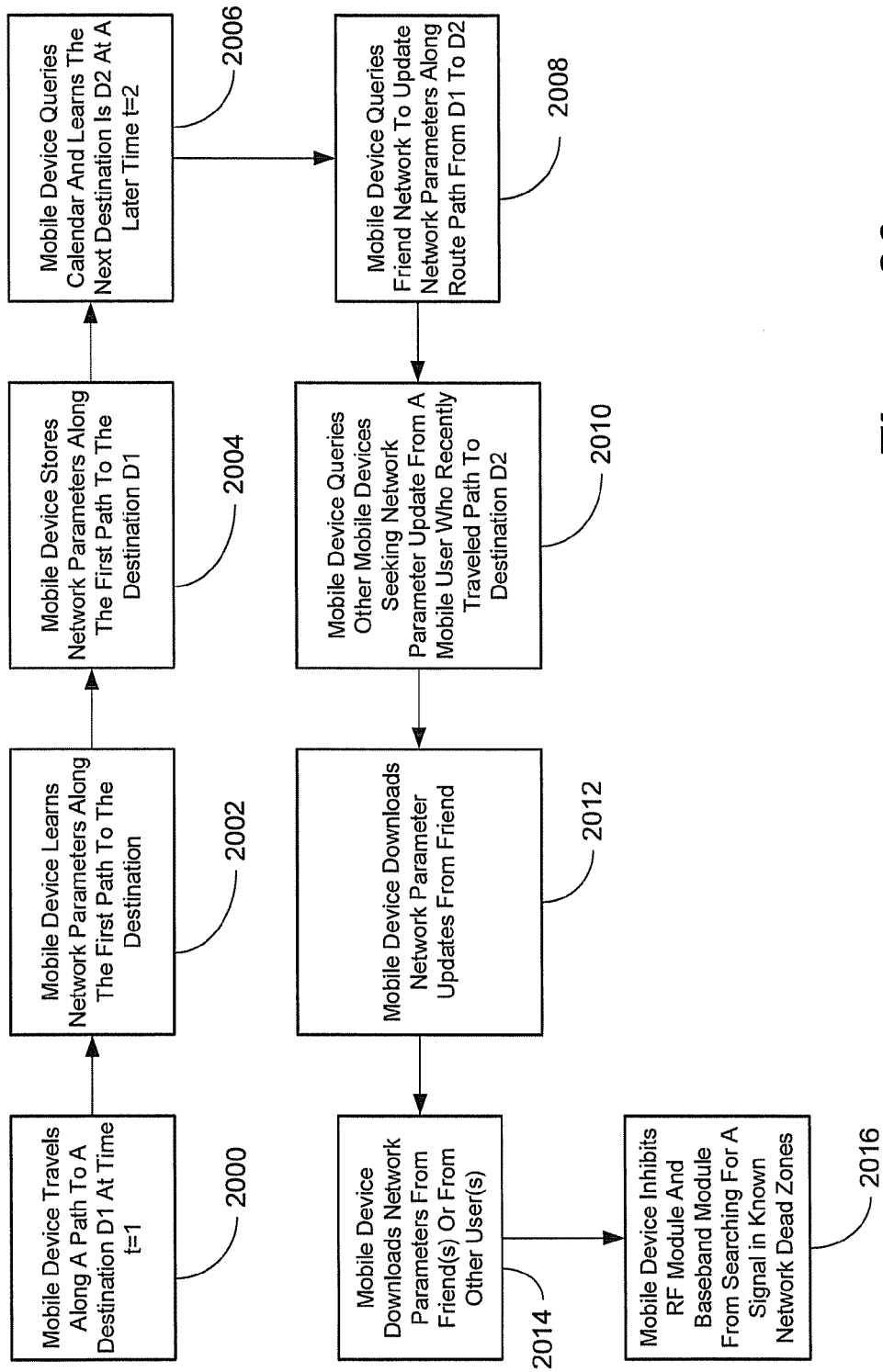
FIG. 20 is a flow chart illustrating how the mobile device learns the network parameters along a path.

FIG. 20 is a flow chart illustrating how the mobile device learns the network parameters along a path. In step 2000, the mobile device travels along a path to destination D1 at time t=1. The mobile device learns (step 2002) and stores (step 2004) the network parameters along the first path to destination D1. In step 2006, the mobile device queries the calendar and learns the next destination is D2 at time t=2. The mobile device queries the network or other users such as friends in steps 2008 and 2010 to update the network parameters along the route path from destination D1 to destination D2. If found, the mobile device obtains and downloads network parameter updates (step 2012) and network parameters (step 2014) from the network, friends or other users. The mobile device then selects which modules and functions to turn on or put into standby or sleep mode to prevent searching for network resources when those resources are known to be unavailable (step 2016). For example, the mobile device inhibits the RF and baseband modules from searching for a signal in known dead zones.

While various embodiments of the invention have been described, it will be apparent to those of ordinary skill in the art that many more embodiments and implementations are possible that are within the scope of this invention.

The invention claimed is:

1. A mobile device network parameter selection method, carried out automatically by one of software and firmware operating on a mobile device, comprising the steps of:
examining a user calendar schedule stored on the mobile device to detect events;
determining map locations for events detected in the user calendar schedule;
storing network parameter resources corresponding to the map locations for the detected events;
predicting network parameter resources the mobile device may be able to utilize in a future time based on the determined map locations for the detected events and the stored network parameter resource; and
configuring the functionality of the mobile device for one of minimized energy usage and data communications costs by performing one or more data communication tasks at times and locations based on the predictions and GPS position of the mobile device.

2. The mobile device network parameter selection method of claim 1, wherein the step of determining map locations is accomplished via location beacons.

3. The mobile device network parameter selection method of claim 2, wherein the location beacons are WiFi transmitters.

4. The mobile device network parameter selection method of claim 2, wherein the location beacons are cellular transmitters.

5. The mobile device network parameter selection method of claim 1, wherein the step of configuring of the functionality of the mobile device is based on least data communication costs.

6. The mobile device network parameter selection method of claim 1, wherein the step of configuring of the functionality of the mobile device factors in latency delays.

7. The mobile device network parameter selection method of claim 1, wherein the step of configuring the functionality of the mobile device optimizes available bandwidth thereby reducing energy used to communicate data.

8. The mobile device network parameter selection method of claim 1, wherein the step of configuring the functionality of the mobile device compares types of bandwidths and associated costs.

9. The mobile device network parameter selection method of claim 1, wherein the step of configuring the functionality of the mobile device implements total throughput.

10. The mobile device network parameter selection method of claim 1, wherein the step of configuring the functionality of the mobile device implements data throttling.

11. The mobile device network parameter selection method of claim 1, wherein the step of storing network parameter resources occurs when the mobile device travels a path a previous time.

12. The mobile device network parameter selection method of claim 11, wherein the network parameter resources are stored in a memory location on the mobile device for later recall.

13. The mobile device network parameter selection method of claim 1, wherein the network parameter resources that are stored are obtained from the mobile device carrier network.

14. The mobile device network parameter selection method of claim 1, wherein the network parameter resources that are stored are obtained in part by querying friends who have traveled to a similar map location along a similar path as the mobile device.

15. The mobile device network parameter selection method of claim 1, wherein the network parameter resources that are stored are obtained in part by querying other network users who have traveled to a similar map location along a similar path as the mobile device.

16. The mobile device network parameter selection method of claim 1, wherein the step of allocating the network parameter resources of the mobile device utilizes information stored in a database on the mobile device.

17. The mobile device network parameter selection method of claim 1, further comprising, buffering data before entering a known coverage dead zone for release while in the dead zone.

18. The mobile device network parameter selection method of claim 1, wherein configuring the functionality of the mobile device includes waiting to connect to the network until moved out of a known dead zone.

19. The mobile device network parameter selection method of claim 1, wherein configuring the functionality of the mobile device includes waiting to connect to the network until moved out of a known dead zone.

20. The mobile device network parameter selection method of claim 1, wherein configuring the functionality of the mobile device includes reverting to sleep mode until a known WiFi hotspot is in range.

21. A method, comprising the steps of:
via one of software and firmware operating on a mobile device,
receiving user calendar data from a user calendar to detect events;
determining map locations for events detected in the user calendar;
receiving and storing network parameter resources corresponding to the determined locations for the detected events;
predicting network parameter resources that the mobile device may be able to utilize at the determined map locations for the detected events;
configuring the functionality of the mobile device for one of minimized energy usage and data communication costs by performing one or more data communication tasks at times and locations based on the predictions and a GPS position of the mobile device.

* * * * *